(12) United States Patent
Tsunashima et al.

(10) Patent No.: US 8,351,757 B2
(45) Date of Patent: Jan. 8, 2013

(54) TELEVISION BROADCAST RECEIVING DEVICE

(75) Inventors: Kenji Tsunashima, Tokyo (JP); Hideki Kawano, Tokyo (JP); Tetsuro Shida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 537 days.

(21) Appl. No.: 12/621,025

(22) Filed: Nov. 18, 2009

(65) Prior Publication Data
US 2010/0129047 A1    May 27, 2010

(30) Foreign Application Priority Data

Nov. 21, 2008 (JP) ................................ 2008-297433
Dec. 5, 2008  (JP) ................................ 2008-310769
Aug. 25, 2009 (JP) ................................ 2009-194511

(51) Int. Cl.
*H04N 5/765* (2006.01)
*H04N 5/94* (2006.01)
*H04N 9/88* (2006.01)

(52) U.S. Cl. ......... 386/200; 386/231; 386/232; 386/263

(58) Field of Classification Search .......... 386/200–232, 386/263–277, 291–299, 343–352
See application file for complete search history.

(56) References Cited

U.S. PATENT DOCUMENTS

| | | | | |
|---|---|---|---|---|
| 5,999,691 A * | 12/1999 | Takagi et al. | ................. | 386/337 |
| 2001/0033737 A1 * | 10/2001 | Honjo | ............................. | 386/52 |
| 2002/0083460 A1 * | 6/2002 | Hejna, Jr. | ........................ | 725/90 |
| 2003/0023988 A1 * | 1/2003 | Lee et al. | ....................... | 725/143 |
| 2003/0106072 A1 * | 6/2003 | Soundararajan | ............... | 725/151 |
| 2006/0036783 A1 * | 2/2006 | Aarts | .............................. | 710/58 |
| 2006/0233519 A1 * | 10/2006 | Narita | ............................. | 386/95 |
| 2006/0258291 A1 * | 11/2006 | Nakata et al. | .............. | 455/67.11 |
| 2008/0056682 A1 * | 3/2008 | Minnick et al. | ................ | 386/112 |
| 2008/0123739 A1 | 5/2008 | Reznic et al. | | |
| 2008/0313667 A1 * | 12/2008 | Ohtsuki | .......................... | 725/32 |

FOREIGN PATENT DOCUMENTS

EP    0 782 139 A2 *  7/1997
JP    2007-507147 A   3/2007

OTHER PUBLICATIONS

Shinko Maekawa, "Wireless HD preps for large-screen debut", Electronic Engineering Times, Jun. 2, 2008, pp. 10-11.

* cited by examiner

*Primary Examiner* — Thai Tran
*Assistant Examiner* — Hung Dang
(74) *Attorney, Agent, or Firm* — Birch, Stewart, Kolasch & Birch, LLP

(57) ABSTRACT

Even when a communication state between a tuner device and a display device is deteriorated, a television broadcast receiving device enables a user to view broadcast. The television broadcast receiving device of the present invention has a tuner section that receives a digital broadcast signal, selects the digital broadcast signal to decode the digital broadcast signal, generates video data including a video signal and an audio signal, and converts the video data into processed video data suitable for wireless communication, and a display section that receives the processed video data from the tuner section through wireless communication, and displays a video based on the processed video data. The tuner section has a recording/playback section that records and reads the video data in and from a predetermined recording section according to a change in state of the communication with the display section.

11 Claims, 20 Drawing Sheets

F I G . 1 8
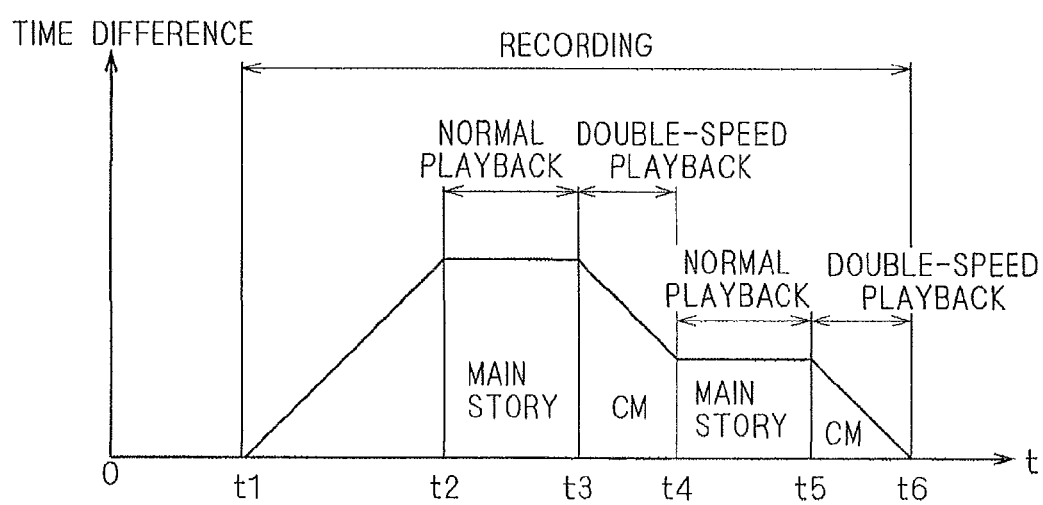

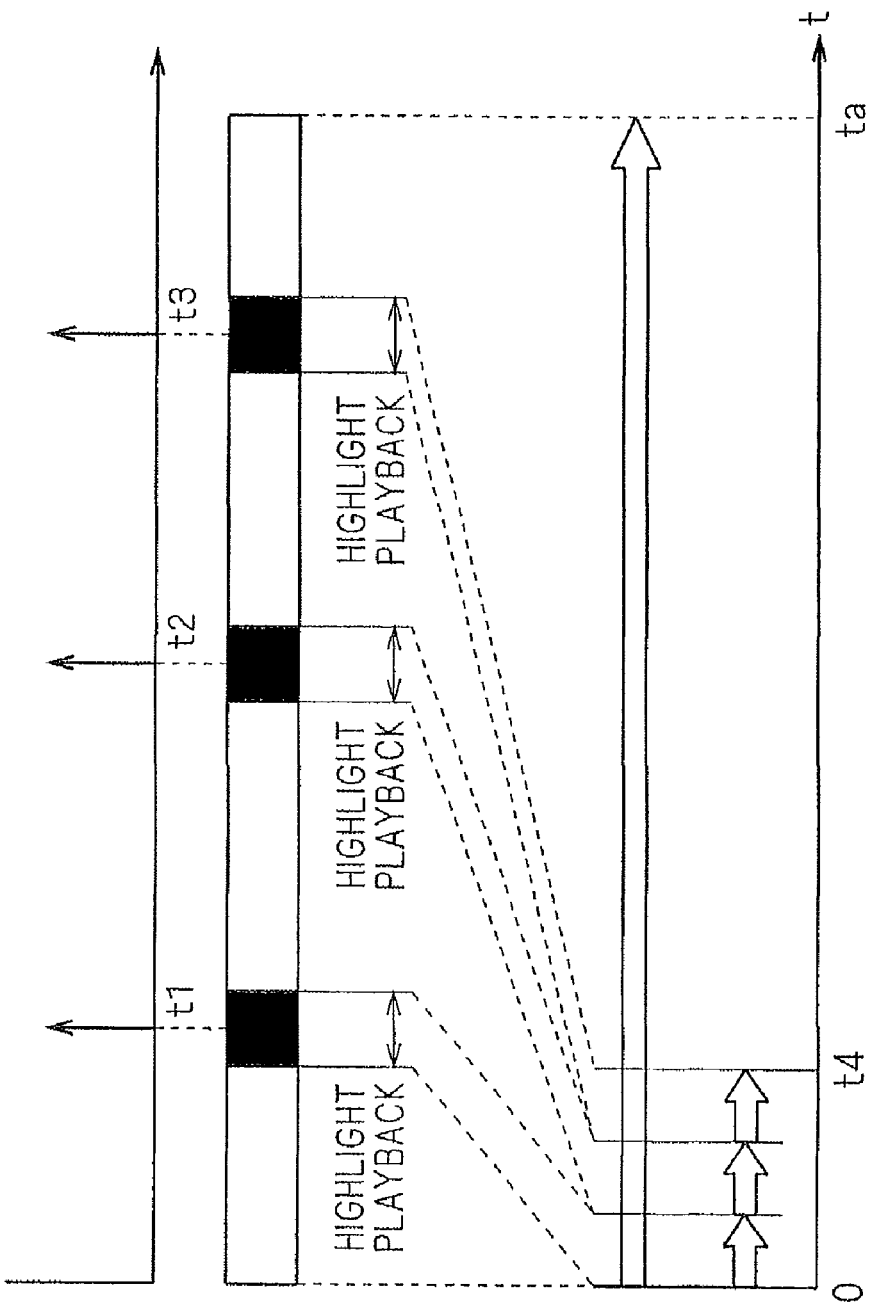

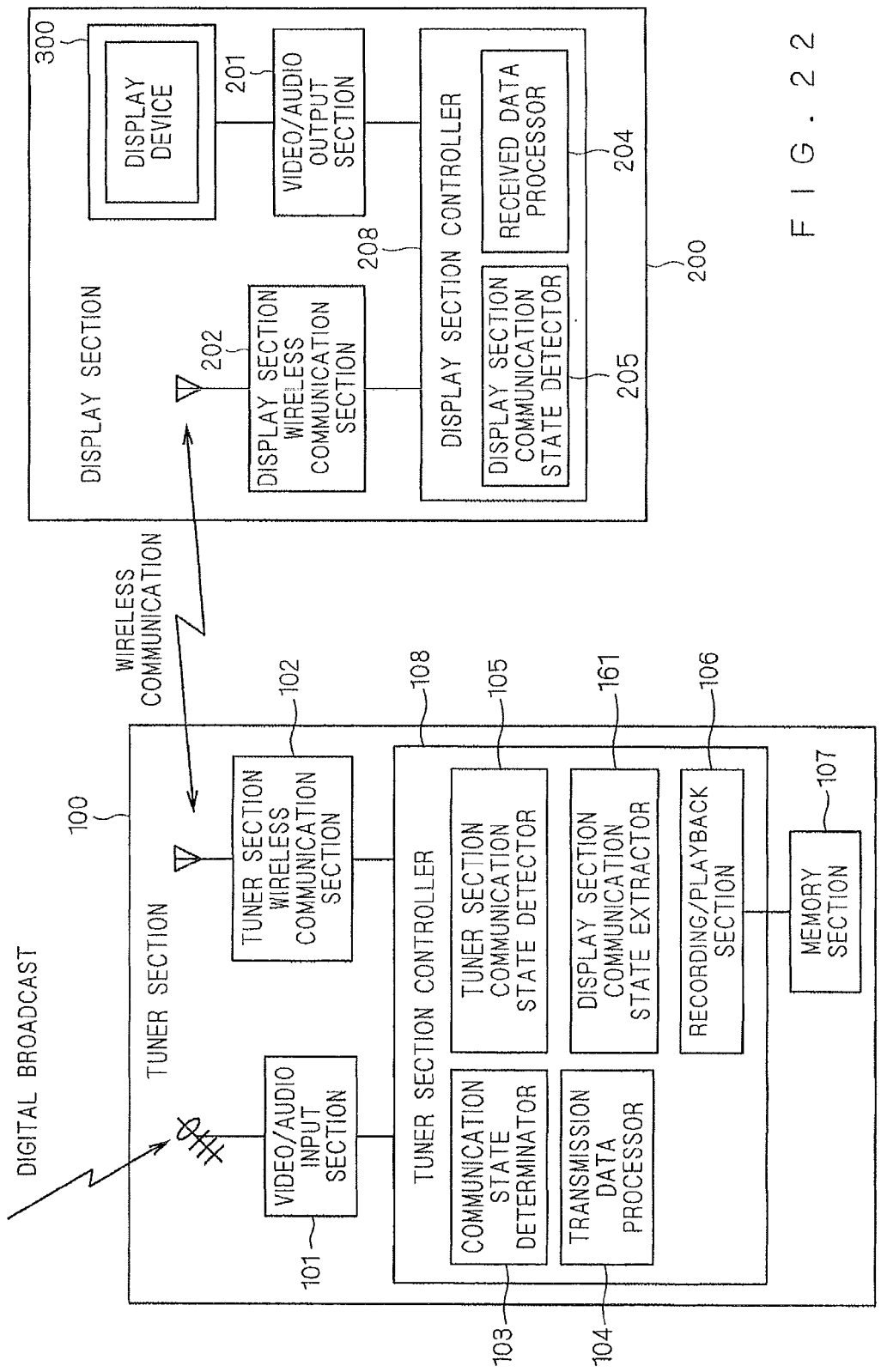

TELEVISION BROADCAST RECEIVING DEVICE

BACKGROUND OF THE INVENTION

1. Field of the Invention

The present invention relates to a television broadcast receiving device constructed to wirelessly transmit a video/audio signal to a display section based on a television broadcast signal received by a tuner section.

2. Description of the Background Art

Display screens of recent television broadcast receivers are thinned out, and products such as wall-hanging televisions go on sale. In such flat-screen televisions, tuner sections that receive and decode broadcast are separated from display sections that display the broadcast on display screens. Interfaces such as HDMI transmit video/audio signals from the tuner sections to the display sections through cables. In order to omit the cable connection between the tuner sections and the display sections, products that adopt the wireless transmission of video/audio signals from the tuner sections to the display sections start to go on sale.

"Electronic Engineering Times, June 2, pp. 10-11" proposes Wireless HD, WHDI (Wireless High Definition Interface) and UWB as wireless transmission systems. Video signals of a base band are transmitted from tuner sections to display sections, and the transmission speed of HDTV signals is 1.5 Gbps. For this reason, various ideas are devised so as to stably transmit video signals of high bit rate. National Publication of Translation No. 2007-507147 (pp. 6-10) describes one concrete example that structures a system being capable of displaying video data of high bit rate without discontinuous screen using a compressing method for separating image data into a rough portion and a fine portion and an MIMO wireless technique even under a noise-rich environment.

In above television broadcast receiving device in which tuner sections and display sections are separated, the following problem of the conventional arts arises. Even when the tuner sections and the display sections are installed in a good visibility state therebetween, data are not always stably transmitted in a wireless manner. For example, when obstacles are provided to a wireless transmission path, radio waves are blocked by the obstacles, and thus the receiving strength on a receiving side is deteriorated or the wireless communication is cut off. Further, in some cases, humans, animals and things move on the wireless transmission path, and thus the communication state changes. Further, the communication state is changed by exogenous noises such as jamming from things other than an installed wireless device (a tuner section and a display section). In this situation, when wireless communication is conducted by the tuner section and the display section that are installed in respective rooms, interference with wireless LAN might disable stable transmission of video and audio.

In such a manner, the communication state always fluctuates due to the influence of humans, animals and things moving on the wireless transmission path and the arrival of exogenous noises. When the communication state is deteriorated, a transmission rate of data is deteriorated as compared to a case where the wireless transmission is normally performed, thereby causing data missing. In the transmission of AV data composed of video data and audio data, the deterioration of the transmission rate due to the change in the communication state causes deterioration of image and sound qualities. When a transmittable rate is deteriorated and the wireless transmission is cut off, video data cannot be transmitted. This problem cannot be solved until a communication route is restructured or the influences of exogenous noises are eliminated. When the communication state is recovered, video data can be transmitted. That is to say, when the communication state is deteriorated, the video data cannot be transmitted during this state, and thus a portion of broadcast that cannot be viewed by a user is generated. As a result, the user cannot sufficiently understand the contents of the broadcast.

SUMMARY OF THE INVENTION

It is, therefore, an object of the present invention to provide a television broadcast receiving device that enables a user to view broadcast even when a communication state between a tuner device and a display device is deteriorated.

The television broadcast receiving device according to the present invention has a tuner section and a display section. The tuner section receives a digital broadcast signal, selects the digital broadcast signal to decode the digital broadcast signal, generates video data including a video signal and an audio signal, and converts the video data into processed video data suitable for wireless transmission. The display section receives the processed video data from the tuner section through wireless communication, and displays a video based on the processed video data. The tuner section further has a recording/playback section. The recording/playback section records and reads the video data in and from a predetermined recording section according to a state of communication with the display section.

The recording/playback section of the tuner section records video data in a predetermined recording section according to the change in the state of the communication with the display section. For this reason, when the communication state between the tuner device and the display device is deteriorated, the recording/playback section records the video data in the recording section, and when the recording/playback section replays the video data from the recording section after the communication state is recovered, a user can view program broadcast without missing of viewing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a diagram illustrating an operation of the television broadcast receiving device according to the eighth embodiment;

FIG. 21 is an explanatory diagram illustrating highlight playback; and

FIG. 22 is a constitutional diagram illustrating the television broadcast receiving device according to a tenth embodiment.

DESCRIPTION OF THE PREFERRED EMBODIMENTS

First Embodiment (Assumption)

Figure 2:
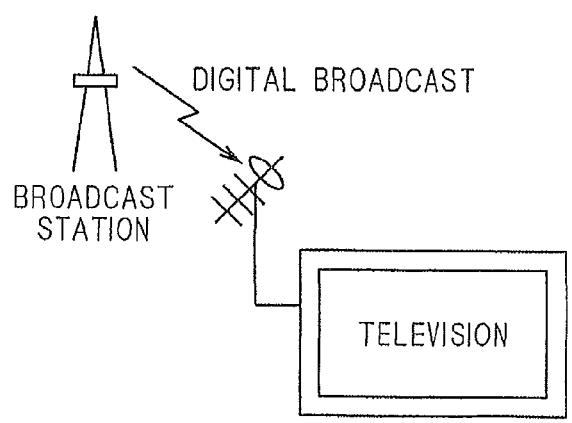
FIG. 2 is a schematic diagram illustrating a constitution of a conventional television broadcast receiving device.

FIG. 2 illustrates an outline of a constitution of a television broadcast receiving device that conventionally spreads. In the conventional television broadcast receiving device, a tuner section is integral with a display section.

Figure 1:
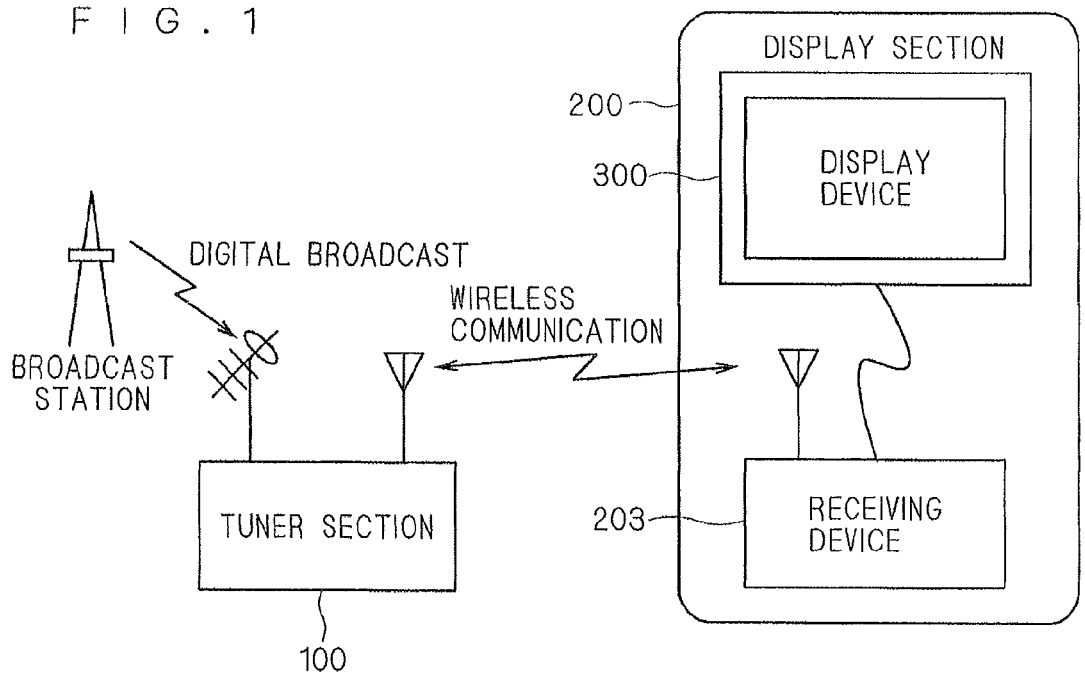
FIG. 1 is a schematic diagram illustrating a constitution of a television broadcast receiving device according to a first embodiment.

On the contrary, FIG. 1 illustrates an outline of a constitution of a television broadcast receiving device according to a first embodiment. The television broadcast receiving device has a tuner section 100 that receives digital broadcast from a broadcast station, and a display section 200 that receives a video data composed of a video signal and an audio signal from the tuner section 100 and displays the video data. The display section 200 has a receiving device 203 that receives the video data from the tuner section 100 through wireless communication, and a display device 300 that displays the video data received by the receiving device 203. In such a manner, the tuner section 100 is separated from the display section 200.

The display device 300 is a liquid crystal panel or a plasma panel. The receiving device 203 and the display device 300 compose the display section 200, but the receiving device 203 and the display device 300 may be installed separately.

(Constitution)

Figure 3:
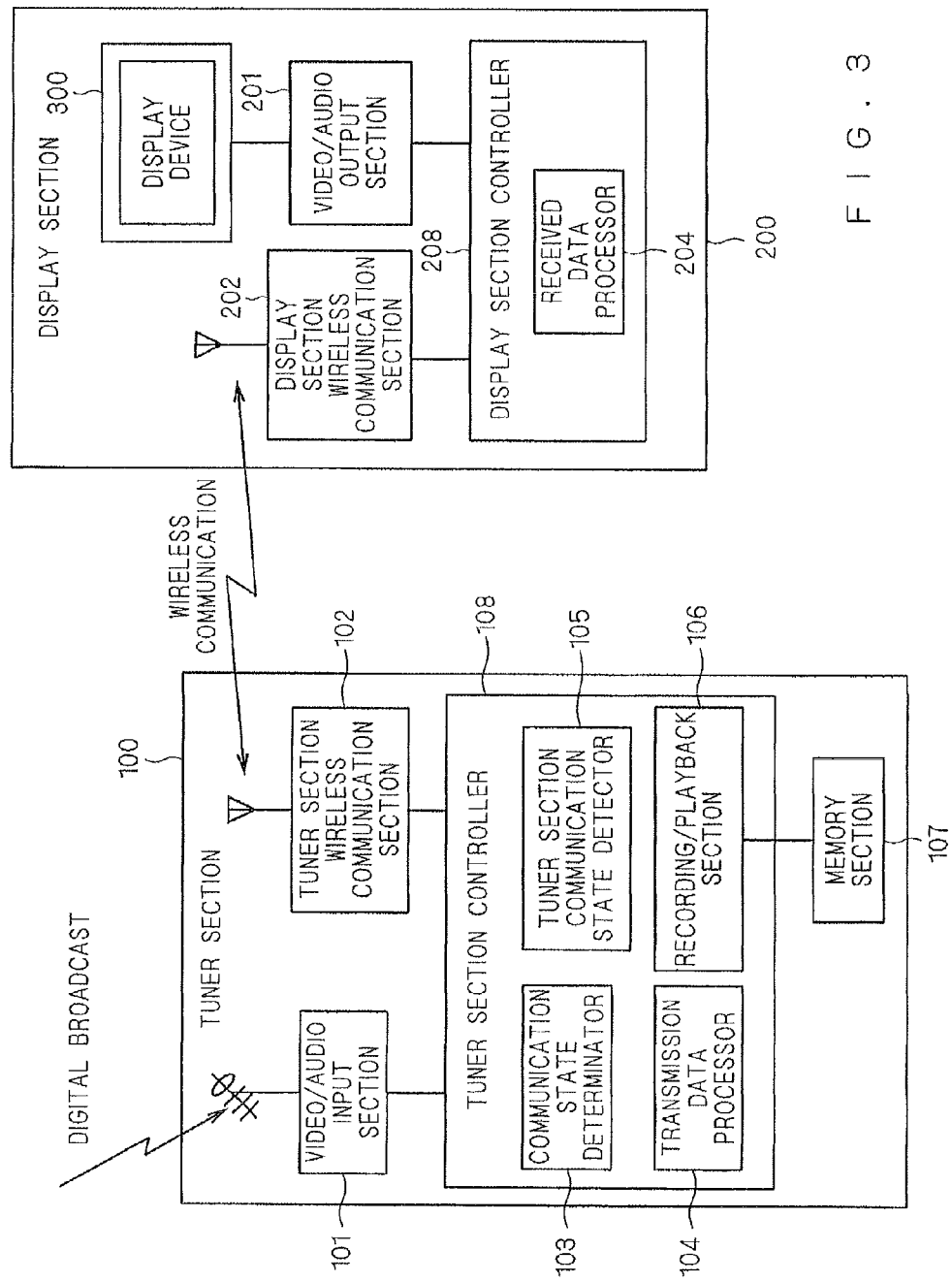
FIG. 3 is a constitutional diagram illustrating a television broadcast receiving device according to the first embodiment.

FIG. 3 concretely illustrates the constitution of the television broadcast receiving device according to the first embodiment. The digital broadcast is described as terrestrial digital broadcast, but the digital broadcast may be satellite digital broadcast, digital cable broadcast, or digital broadcast utilizing an internet network.

The television broadcast receiving device according to the first embodiment has the tuner section 100 and the display section 200. The tuner section 100 receives digital broadcast, and decodes video data that is compressed by MPEG. The video data is a TS stream. The tuner section 100 wirelessly transmits the decoded video data to the display section 200.

The display section 200 receives the video data from the tuner section 100, and displays a video based on the video data.

The tuner section 100 has a video/audio input section 101, a tuner section controller 108, a memory section 107, and a tuner section wireless communication section 102. The video/audio input section 101 receives video data as digital broadcast from a broadcast station. The tuner section controller 108 receives the video data from the video/audio input section 101, and performs a predetermined process on the video data so as to output the processed video data. The memory section 107 records the video data according to a state of the communication with the display section 200. The tuner section wireless communication section 102 receives the processed video data from the tuner section controller 108 and wirelessly transmits it to the display section 200.

The video/audio input section 101 has a selecting function for receiving digital broadcast and a function for acquiring a TS stream. The video/audio input section 101 selects a channel under the control of the tuner section controller 108, and outputs video data composed of the TS stream.

The tuner section wireless communication section 102 has a function for a selecting operation and for performing modulation determined by a wireless communication method under the control of the tuner section controller 108. The wireless communication system includes, for example, UWB (Ultra Wide Band). A communication system that is uniquely developed may be adopted, but in this method, bidirectional communication is required between the tuner section 100 and the display section 200.

The tuner section wireless communication section 102 acquires the processed video data from the tuner section controller 108, and transmits it to the display section 200 through the wireless communication. Further, the tuner section wireless communication section 102 adjusts the transmission output to the display section 200 and adjusts the receiving from the display section 200 under the control of the tuner section controller 108.

The tuner section wireless communication section 102 transmits information determined by the wireless communication system, information for controlling the operations of the display section 200 such as turning-on/off of the power, and tuner section auxiliary data composed of an ACK signal indicating the receiving of display section auxiliary data. The display section auxiliary data is composed of any one of or both of a control signal such as the ACK signal indicating the receiving in the display section 200 of the processed video data or the tuner section auxiliary data or specific information indicating the display section 200, and the other information about a user input such as a remote controller.

Further, the tuner section wireless communication section 102 performs bidirectional communication with the display section 200, and receives data from the display section 200. The tuner section wireless communication section 102 transmits the received data to the tuner section controller 108.

Video data from the video/audio input section 101 is stored in the memory section 107 according to the wireless communication state under the control of the tuner section controller 108. The video data may be a TS stream acquired from the video/audio input section 101 or a digital-base band signal. The memory section 107 is incorporated into the tuner section 100 in FIG. 3, but it may be provided outside the tuner section 100. Further, the memory section 107 may be any one of a semiconductor storage element, HDD, DVD and the like. The semiconductor storage element includes a USB memory and a memory card utilizing a flash memory.

The tuner section controller 108 entirely controls the tuner section 100, receives video data from the video/audio input section 101, processes the video data, and outputs the processed video data suitable for the wireless communication.

That is to say, the television broadcast receiving device according to the first embodiment has the tuner section 100 and the display section 200. The tuner section 100 receives a digital broadcast signal, selects the digital broadcast signal to decode the digital broadcast signal, generates video data including a video signal and an audio signal, and converts the video data to processed video data suitable for the wireless communication. The display section 200 receives the processed video data from the tuner section 100 through the wireless communication, and displays a video based on the processed video data. The tuner section 100 records the video data in the predetermined memory section (recording section) 107 according to the change in the state of the communication with the display section 200. Since the video data is recorded according to the change in the state of the communication between the tuner section 100 and the display section 200, even if the communication state changes, the video data is not lost.

The tuner section controller 108 has a tuner section communication state detector 105, a communication state determinator 103, a recording/playback section 106, and a transmission data processor 104.

The tuner section communication state detector 105 detects the state of the communication in the tuner section wireless communication section 102 with the display section 200. The communication state is detected by detecting predetermined information indicating the communication state from a signal transmitted/received by the tuner section wireless communication section 102. For example, an error rate of a signal received from the display section 200 is detected. In another manner, an SN ratio or a CN ratio of a transmission channel for transmission to the display section 200 may be detected. Further, an SN ratio or a CN ratio of a channel for the receiving from the display section 200 is detected. Some or all of these items may be detected. The detected contents are output as tuner section communication state data to the communication state determinator 103.

The communication state determinator 103 receives the tuner section communication state data from the tuner section communication state detector 105, and determines whether the communication state between the tuner section 100 and the display section 200 is excellent or defective. For example, the communication state determinator 103 makes the determination based on an increase in the error rate (namely, the error increases).

The transmission data processor 104 receives the video data from the video/audio input section 101, converts it into processed video data with a format suitable for the wireless communication, and outputs the processed video data to the tuner section wireless communication section 102. The concrete operation is described later with reference to FIG. 4.

The recording/playback section 106 receives the video data from the video/audio input section 101, buffers the data, and records the video data in the memory section 107. Further, the recording/playback section 106 reads the video data recorded in the memory section 107 as replayed video data.

That is to say, in the television broadcast receiving device according to the first embodiment, the tuner section 100 has the video/audio input section 101, the tuner section controller 108, and the tuner section wireless communication section 102. The video/audio input section 101 receives and selects a digital broadcast signal. The tuner section controller 108 controls the operation of the tuner section 100. The tuner section wireless communication section 102 wirelessly transmits processed video data to the display section 200. The tuner section controller 108 has the transmission data processor 104, the tuner section communication state detector 105, the communication state determinator 103, and the recording/playback section 106. The transmission data processor 104 receives video data from the video/audio input section 101 to decode it, and converts the video data into the processed video data. The tuner section communication state detector 105 detects the state of the communication in the tuner section wireless communication section 102 with the display section 200, and outputs the detected result as the tuner section communication state data. The communication state determinator 103 determines a defect of the communication state based on the tuner section communication state data. The recording/playback section 106 receives the video data from the video/audio input section 101, records the video data in the memory section 107 according to the determined result in the communication state determinator 103, and reads the video data recorded in the memory section 107 as the playback video data. Since the tuner section communication state determinator 103 determines whether the video data is stored, video data does not have to be always recorded during the receiving of digital broadcast, thereby reducing storage capacity of the memory section 107.

(Transmission Data Processor 104)

Figure 4:
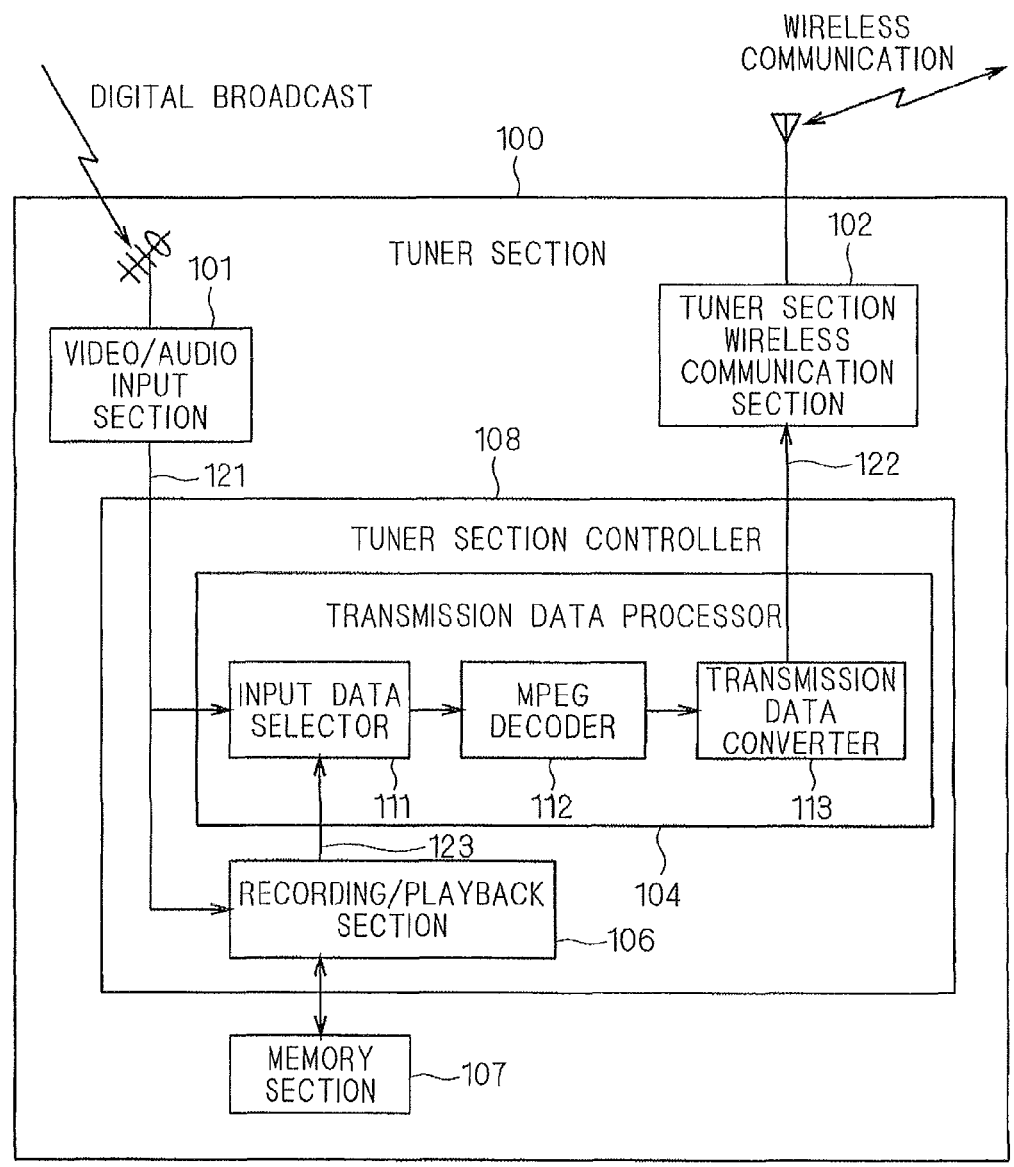
FIG. 4 is a constitutional diagram illustrating a periphery of a transmission data processor according to the first embodiment.

FIG. 4 is a diagram illustrating a constitution around the transmission data processor 104. The transmission data processor 104 has an input data selector 111, an MPEG decoder 112 and a transmission data converter 113.

The input data selector 111 receives video data 121 from the video/audio input section 101, receives replayed video data from the recording/playback section 106, and selects any one of the data as an input so as to output the selected data to the MPEG decoder 112.

The MPEG decoder 112 separates the video data or the playback video data selected by the input data selector 111 into a video signal, an audio signal and an accompanying signal, and decodes the video signal and the audio signal with reference to the accompanying signal, so as to output the decoded signals to the transmission data converter 113.

The transmission data converter 113 receives the decoded video signal and audio signal from the MPEG decoder 112, and performs processes for transmission of the video data to the display section 200, such as data conversion determined by the wireless communication system and data addition for correcting an error. The processed video data is output as processed video data 122 to the tuner section wireless communication section 102. The tuner section wireless communication section 102 wirelessly transmits the processed video data to the display section 200.

(Constitution of Display Section)

The constitution of the display section 200 is described below with reference to FIG. 3. The display section 200 has a display section wireless communication section 202, a display section controller 208, a video/audio output section 201, and a display device 300.

The display section wireless communication section 202 receives the processed video data and tuner section auxiliary data from the tuner section wireless communication section 102 of the tuner section 100 through the wireless communication, and outputs them to the display section controller 208.

Further, the display section wireless communication section 202 transmits information determined by the wireless communication system, information indicating the state of the display section 200 such as an ON/OFF state of the power, and display section auxiliary data composed of an ACK signal or the like indicating the receiving of the tuner section auxiliary data to the tuner section 100.

Further, the display section wireless communication section 202 has a function for the selecting operation and for performing demodulation determined by the wireless communication system under the control of the display section controller 208. As the wireless communication system, the wireless communication system that is the same as that of the tuner section 100 is used. Further, the display section wireless communication section 202 adjusts a transmission output in the display section wireless communication section 202 under the control of the display section controller 208, and adjusts the receiving of communication from the tuner section 100.

The display section controller 208 that controls the whole of the display section 200 has a received data processor 204. The received data processor 204 receives the processed video data from the display section wireless communication section 202, and returns the processed video data back to the original video data so as to output it to the video/audio output section 201.

The video/audio output section 201 receives the video data from the display section controller 208, and converts it into a format suitable for a specification of the display device 300 so as to output the converted data to the display device 300.

The display device 300 receives the video data from the video/audio output section 201, and displays it on the screen. As the display device 300, LCD, a plasma display or an organic EL (Electra Luminescence) display is used.

(Operation)

A route of the received digital broadcast in the tuner section 100 is described with reference to FIG. 4. When the video/audio input section 101 receives the video data 121 as digital broadcast from a broadcast station, the video data 121 is input into the transmission data processor 104 and the recording/playback section 106 in the tuner section controller 108.

When the communication state determinator 103 determines that the communication state is excellent, the tuner section controller 108 instructs the transmission data processor 104 to transmit the video data 121 to the display section 200. That is to say, the input data selector 111 selects the video data 121, and outputs it to the MPEG decoder 112.

On the other hand, when the determination is made that the communication state is defective, the recording/playback section 106 records the video data 121 in the memory section 107.

When the determined result in the communication state determinator 103 is changed from defective into excellent, the recording/playback section 106 reads the video data recorded in the memory section 107 as playback video data 123, and outputs the playback video data 123 to the input data selector 111. The input data selector 111 selects the playback video data 123 from the recording/playback section 106 as an input, and outputs it to the MPEG decoder 112. In the MPEG decoder 112 and the transmission data converter 113, the playback video data 123 is converted into the processed video data 122 by the MPEG decoding and the converting process, and the processed video data 122 is transmitted to the display section 200 via the tuner section wireless communication section 102. Further, the recording/playback section 106 reads the playback video data 123 from the memory section 107, whereas it records the video data 121 in the memory section 107. The recording and playback in the recording/playback section 106 are continued for predetermined time after the communication state is changed into excellent, and then are ended.

That is to say, in the television broadcast receiving device according to the first embodiment, the transmission data processor 104 has the input data selector 111, the MPEG decoder 112, and the transmission data converter 113. The input data selector 111 selects one of the video data 121 and the playback video data 123. The MPEG decoder 112 performs the MPEG decoding process on the data selected by the input data selector 111. The transmission data converter 113 converts the data decoded by the MPEG decoder 112 into processed video data, and outputs the processed video data to the tuner section wireless communication section 102. When the communication state determinator 103 determines that the communication state is excellent, the input data selector 111 selects the video data 121. When the communication state determinator 103 determines that the communication state is defective, the recording/playback section 106 records the video data 121 in the memory section 107, and when the communication state is changed from defective into excellent, the playback video data 123 is read from the memory section 107 so as to be selected by the input data selector 111. The video data 121 at the time when the communication state is defective is recorded, and when the communication state is changed from defective into excellent, the video data 121 is replayed as the playback video data 123 so as to be wirelessly transmitted to the display section 100. As a result, even if the communication state is defective, the user can understood the broadcast contents without missing the viewing chance.

Figure 5:
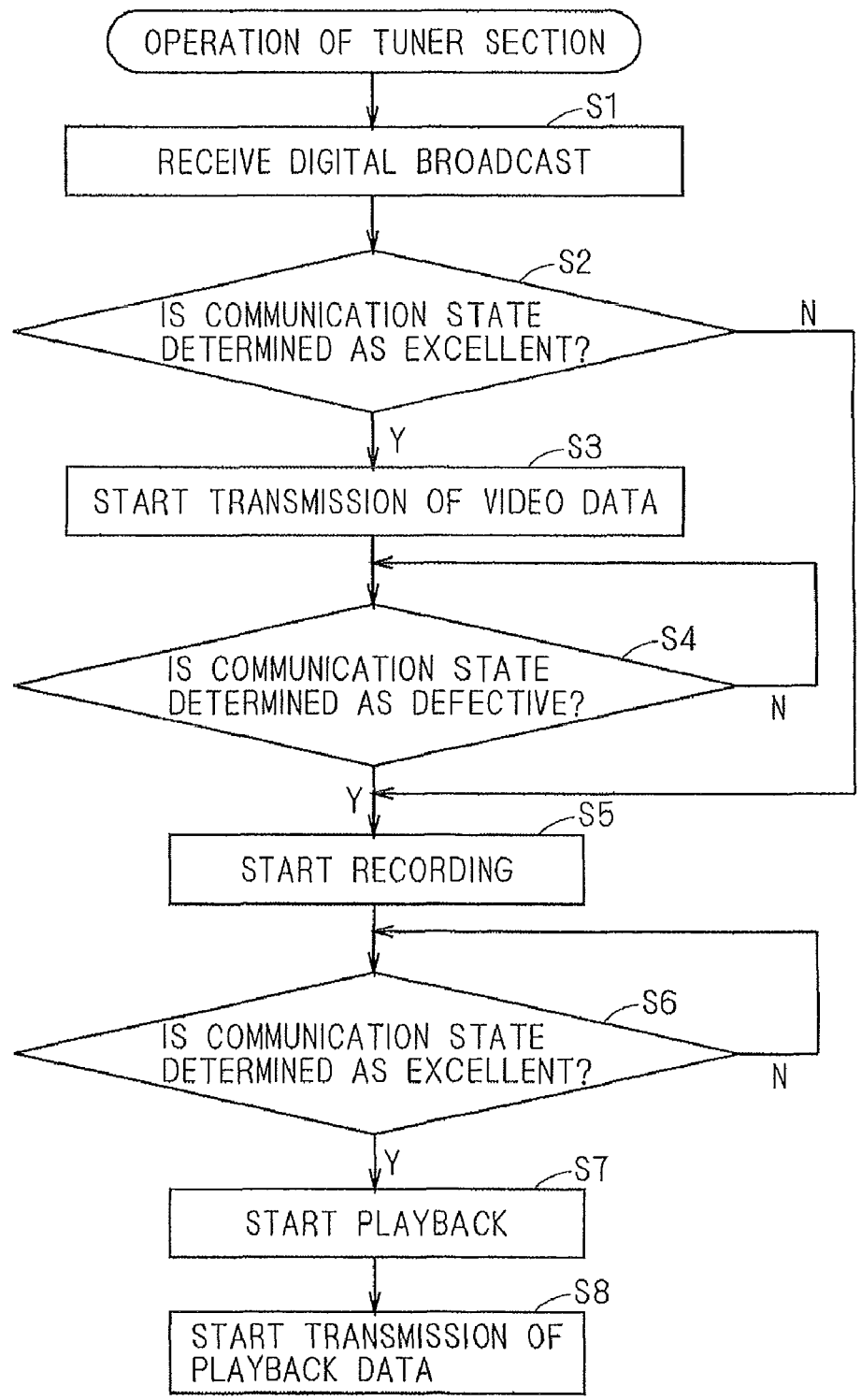
FIG. 5 is a flowchart illustrating an operation of a tuner section according to the first embodiment.

FIG. 5 is a flowchart illustrating the operation of the tuner section 100. The tuner section 100 receives a selecting request from the user, and starts to receive digital broadcast (step S1).

The tuner section 100 and the display section 200 start the wireless communication, and the tuner section 100 allows the communication state determinator 103 to determines the communication state in the tuner section wireless communication section 102 (step S2).

When the communication state is determined as excellent, the tuner section controller 108 instructs the input data selector 111 of the transmission data processor 104 to select the video data 121 received by the video/audio input section 101. In the transmission data processor 104, the MPEG decoder 112 MPEG-decodes the video data 121, and the transmission data converter 113 converts it into the processed video data 122 for the wireless communication. The processed video data 122 is started to be transmitted from the tuner section wireless communication section 102 to the display section 200 (step S3).

When the communication state determinator 103 determines the communication state as defective at step S2, the recording/playback section 106 starts to record the video data 121 in the memory section 107 under the control of the tuner section controller 108 (step S5).

When the transmission of the video data 121 is started at step S3, the tuner section 100 restarts to monitor the communication state (step S4).

When the communication state determinator 103 determines that the communication state is defective at step S4, the recording/playback section 106 records the video data 121 about a selected program in the memory section 107 according to the instruction from the tuner section controller 108 (step S5).

The tuner section 100 determines the communication state (step 6), and continues the recording in the memory section 107 until the communication state is changed into excellent.

When the communication state determinator 103 determines that the communication state is excellent at step 86, the recording/playback section 106 records the video data 102 according to the instruction from the tuner section controller 108, and simultaneously replays the recorded video data 121 as the playback video data 123 (step S7).

In the transmission data processor 104, the input data selector 111 selects the playback video data 123, the MPEG decoder 112 MPEG-decodes the playback video data 123, the transmission data converter 113 performs a converting process suitable for the wireless communication on it. The converted playback video data 123 is transmitted from the tuner section wireless communication section 102 to the display section 200 (step S8).

(Effect)

According to the first embodiment, the following effect is produced as described before. That is to say, the television broadcast receiving device according to the first embodiment has the tuner section 100 and the display section 200. The tuner section 100 receives a digital broadcast signal, selects the digital broadcast signal to decode the digital broadcast signal, and generates video data including a video signal and an audio signal so as to convert the video data into processed video data suitable for the wireless communication. The display section 200 receives the processed video data from the tuner section 100 through the wireless communication, and displays a video based on the processed video data. The tuner section 100 records the video data in the memory section 107 according to the change in the state of the communication with the display section 200. Since the video data is recorded according to the change in the communication state between the tuner section 100 and the display section 200, even if the communication state changes, the video data is not lost.

In the television broadcast receiving device according to the first embodiment 1, the tuner section 100 has the video/audio input section 101, the tuner section controller 108, and the tuner section wireless communication section 102. The video/audio input section 101 receives and selects a digital broadcast signal. The tuner section controller 108 controls the operation of the tuner section 100. The tuner section wireless communication section 102 wirelessly transmits processed video data to the display section 200. The tuner section controller 108 has the transmission data processor 104, the tuner section communication state detector 105, the communication state determinator 103, and the recording/playback section 106. The transmission data processor 104 receives the video data from the video/audio input section 101, and decodes the video data so as to convert it into processed video data. The tuner section communication state detector 105 detects the state of the communication between the tuner section wireless communication section 102 and the display section 100, and outputs the detected result as the tuner section communication state data. The communication state determinator 103 determines a defect of the communication state based on the tuner section communication state data. The recording/playback section 106 receives the video data from the video/audio input section 101, records the video data in the memory section 107 according to the determined result in the communication state determinator 103, and reads the video data recorded in the memory section 107 as playback video data. Since the tuner section communication state determinator 103 determines whether the video data is stored, the recording does not have to be always performed during the receiving of digital broadcast, thereby reducing the storage capacity of the memory section 107.

Further, in the television broadcast receiving device according to the first embodiment, the transmission data processor 104 has the input data selector 111, the MPEG decoder 112, and the transmission data converter 113. The input data selector 111 selects one of the video data 121 and the playback video data 123. The MPEG decoder 112 performs the MPEG decoding process on the data selected by the input data selector 111. The transmission data converter 113 converts the data decoded by the MPEG decoder into processed video data, and outputs the processed video data to the tuner section wireless communication section 102. When the communication state determinator 103 determines that the communication state is excellent, the input data selector 111 selects the video data 121, and when the communication state determinator 103 determines that the communication state is defective, the recording/playback section 106 records the video data 121 in the memory section 107. When the communication state is changed from defective to excellent, the recording/playback section 106 reads the playback video data 123 from the memory section 107, and the read playback video data 123 is selected by the input data selector 111. The video data 121 at the time when the communication state is defective is recorded, and when the communication state is changed from defective into excellent, the video data 121 is replayed as the playback video data 123 and is wirelessly transmitted to the display section 200, thereby enabling the user to understand the broadcast contents without missing the viewing chance.

Second Embodiment (Constitution)

Figure 6:
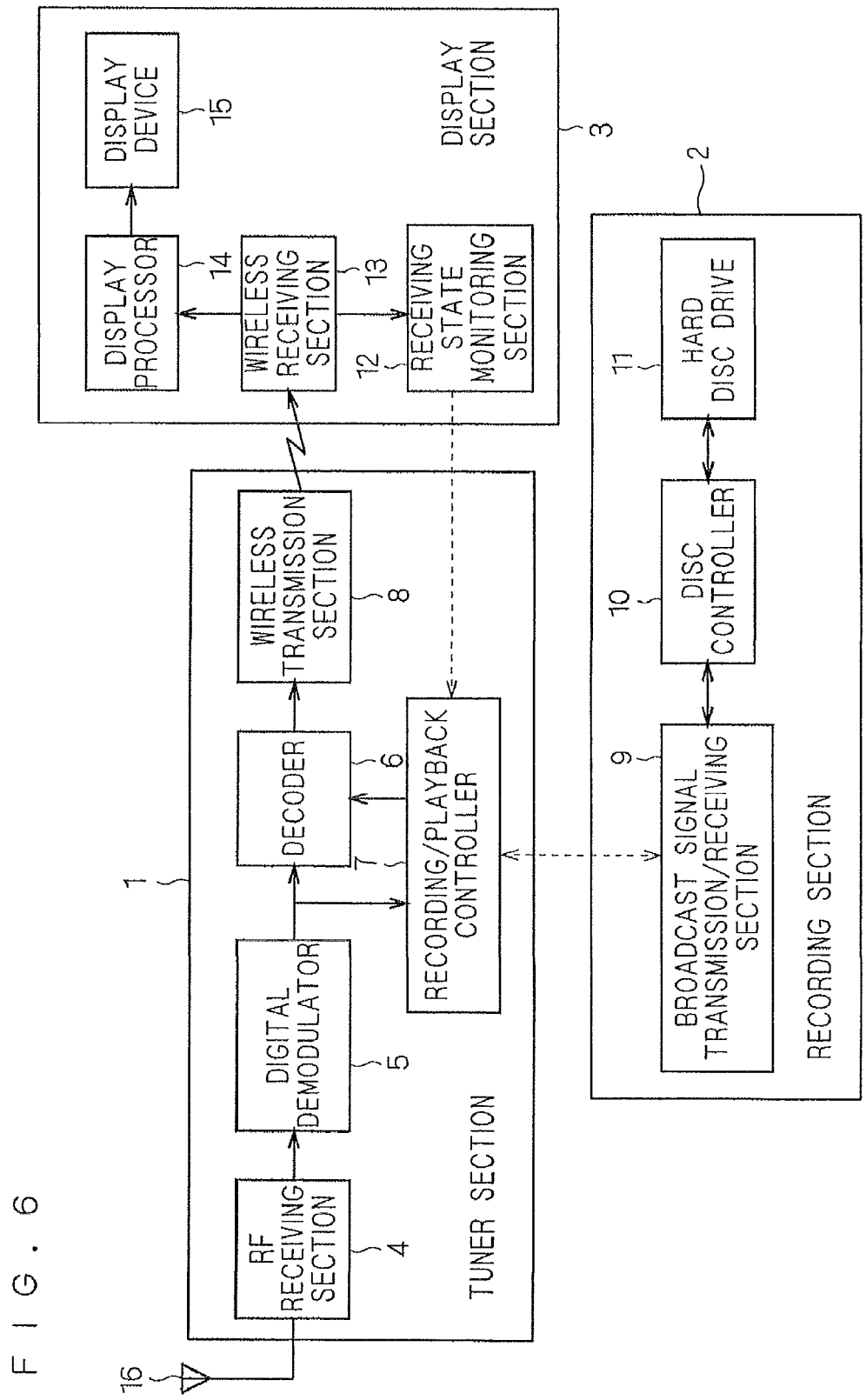
FIG. 6 is a constitutional diagram illustrating a television broadcast receiving device according to a second embodiment.

FIG. 6 is a block diagram illustrating the constitution of the television broadcast receiving device according to a second embodiment. The television broadcast receiving device according to the second embodiment is a unit in which the memory section 107 of the first embodiment is independent from the tuner section to be a recording section 2, and is connected from the tuner section via a network. In the second embodiment, an RF receiving section 4 corresponds to the video/audio input section 101, and a wireless transmission section 8 corresponds to the tuner section wireless communication section 102 of the first embodiment. Further, a recording/playback controller 7 corresponds to the recording/playback section 106 of the first embodiment, and a digital demodulator 5 and a decoder 6 correspond to the tuner section controller 108.

That is to say, the television broadcast receiving device according to the second embodiment has a tuner section 1, a display section 3, and a recording section 2. The tuner section 1 receives television broadcast. The display section 3 receives a video/audio signal from the tuner section 1 through wireless communication, and displays a video based on the video/audio signal. The recording section 2 is connected to the tuner section 1 via the network, receives a broadcast signal received by the tuner section 1 from the tuner section 1 via the network based on a receiving state of the video/audio signal in the display section 3, and records it.

The operation according to the second embodiment is similar to that of the first embodiment except that the transmission of a video signal from the tuner section 1 to the recording section 2 via the network.

When a determination is made that the receiving state is deteriorated and this state is detrimental to screen display, the recording/playback controller 7 transmits the broadcast signal sent from the digital demodulator 5 to the recording section 2 via the network, and instructs the recording section 2 to record the broadcast signal. In the recording section 2, a broadcast signal transmission/receiving section 9 receives a stream of the broadcast signal sent from the tuner section 1, and records the stream in an HDD 11 via a disc controller 10.

When the normal wireless transmission state between the tuner section 1 and the display section 3 is recovered after the start of the recording in the HDD 11, the recording/playback controller 7 instructs the recording section 2 to replay the broadcast signal recorded in the HDD 11 while continuing recording of the broadcast signal. As a result, the broadcast signal is read into the broadcast signal transmission/receiving section 9 from the HDD 11 via the disc controller 10, and is transmitted to the recording/playback controller 7 via the network. The stream of the replayed broadcast signal is sent to the decoder 6, and is decoded instead of the output from the digital demodulator 5. The broadcast signal read from the recording section 2 undergoes the similar process to the process which the broadcast signal output from the digital demodulator 5 undergoes, and is wirelessly transmitted as a video/audio signal to the display section 3 so as to be displayed on the screen by the display device 15.

As the network between the tuner section 1 and the recording section 2, various kinds of ones can be used, and particularly, wireless LAN can be used.

That is to say, the network that connects the tuner section 1 and the recording section 2 is the wireless LAN. As a result, cable connection between the tuner section 1 and the recording section 2 is not necessary.

When the tuner section 1 and the recording section 2 are connected by the network, one recording section 2 can cope with a plurality of tuner sections 1 and display sections 3. That is to say, even if a plurality of television broadcast receiving devices is installed, only one recording section 2 is used.

Third Embodiment (Constitution)

Figure 7:
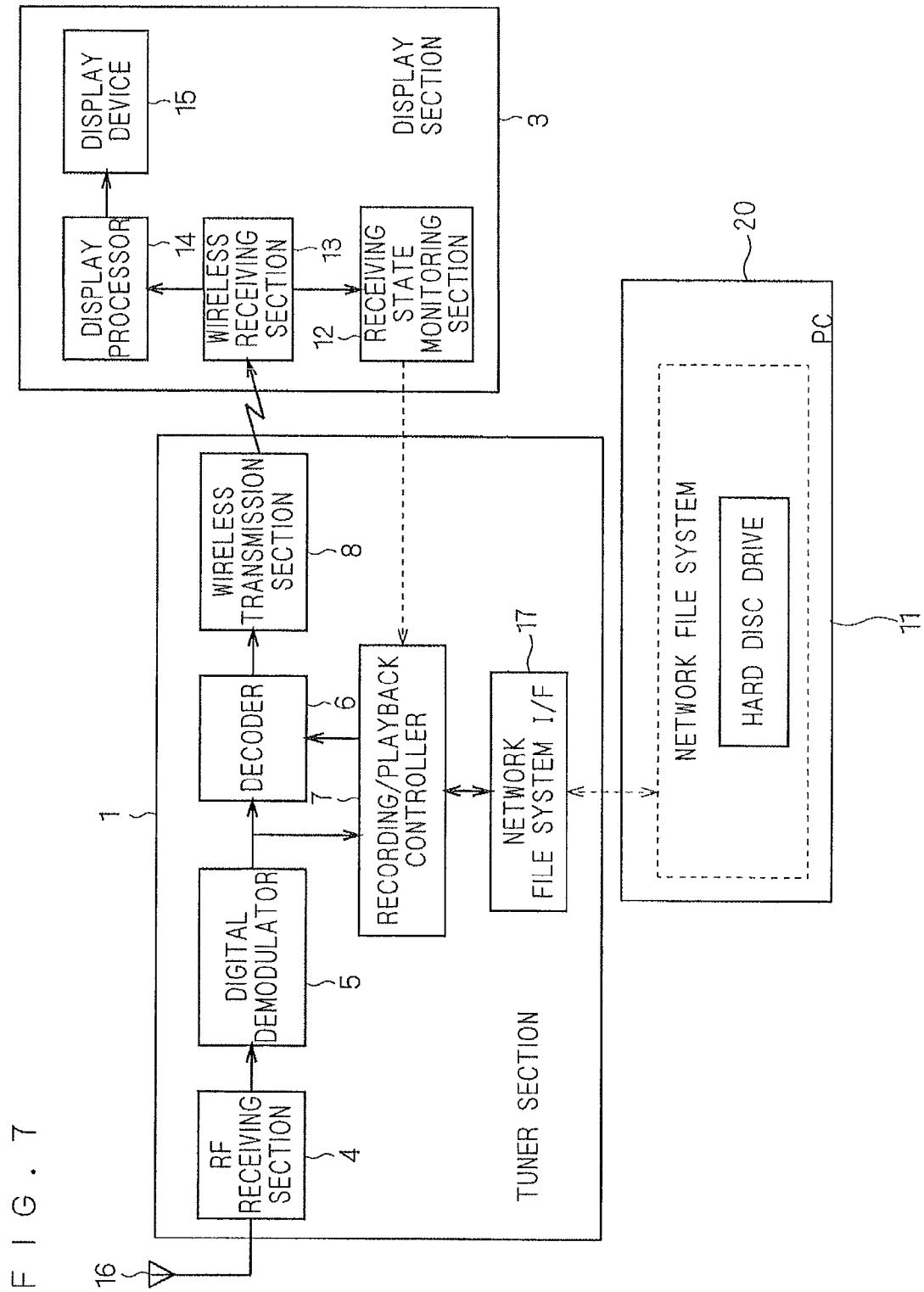
FIG. 7 is a constitutional diagram illustrating a television broadcast receiving device according to a third embodiment.

FIG. 7 is a block diagram illustrating a constitution of the television broadcast receiving device according to a third embodiment. In the television broadcast receiving device according to the third embodiment, the recording section 2 of the second embodiment is replaced by a general-purpose personal computer (hereinafter, "PC") 20, and the tuner section 1 has a network file system interface (IF) 17. Since the other parts of the constitution are the same as those in the second embodiment, the description thereof is omitted.

The recording/playback controller 7 transmits/receives a broadcast signal with the HDD 11 via the network file system I/F 17.

The network file system is a system that utilizes a storage device, built in the other PC connected via the network or connected as a local disc, as a storage device owned by itself so as to share a file. The network file system is generally provided as software that is called file sharing for Windows® or NFS (Network File System) for an operating system (OS) such as Linux/Unix®, and can be used normally without adding the software to PC.

(Operation)

The operation of the television broadcast receiving device according to the third embodiment is the same as that in the second embodiment except that the recording/playback controller 7 records and replays a broadcast signal.

When the deterioration in the receiving state of a video/audio signal in a wireless receiving section 13 is sent from a wireless receiving monitoring section 12 to the recording/playback controller 7, the recording/playback controller 7 records the broadcast signal received from the digital demodulator 5 into the HDD 11 of the PC 20 via the network file system I/F 17. At this time, since the storage device on the PC 20 is recognized as a local disc by the recording/playback controller 7 due to the network file system, direct writing is carried out.

When the receiving state is improved, the recording/playback controller 7 reads the broadcast signal recorded in the HDD 11. The operation thereafter is similar to that in the second embodiment, and thus the read broadcast signal is decoded as a video/audio signal by the decoder 6, and the video/audio signal is wirelessly transmitted to the wireless receiving section 13 of the display section 3 from the wireless transmission section 8 so that an image is restarted to be displayed on the display device 15.

That is to say, in the television broadcast receiving device according to the third embodiment, the recording section 2 is the PC 20 that is connected to the tuner section 1 by the network file system via the network, and is provided with the HDD 11 as the storage device. The recording/playback controller 7 records and reads a broadcast signal in/from the HDD 11 through the network file system. Since the general-purpose PC 20 is used as a unit that records a broadcast signal in the third embodiment, a new device that records a broadcast signal is not necessary.

(Effect)

In the television broadcast receiving device according to the third embodiment, the recording section 2 is the PC 20 that is connected to the tuner section 1 by the network file system via the network, and is provided with the HDD 11 as the storage device. The recording/playback controller 7 records and reads a broadcast signal in/from the HDD 11 through the network file system. Since the general-purpose PC 20 is used as a unit that records a broadcast signal in the third embodiment, a new device that records a broadcast signal is not necessary.

Fourth Embodiment (Constitution)

Figure 8:
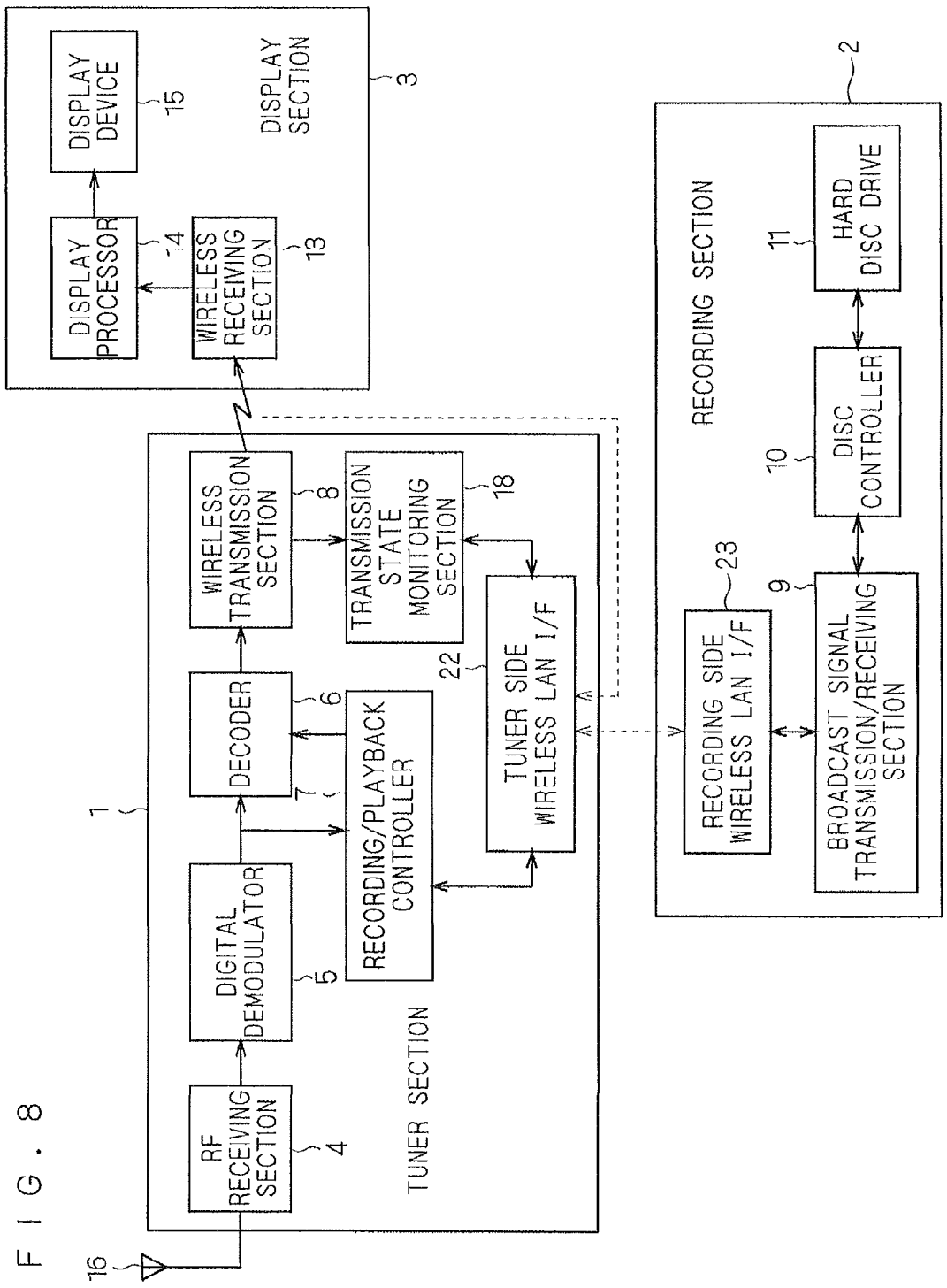
FIG. 8 is a constitutional diagram illustrating a television broadcast receiving device according to a fourth embodiment.

FIG. 8 is a block diagram illustrating a constitution of the television broadcast receiving device according to a fourth embodiment. The television broadcast receiving device according to the fourth embodiment is constituted by adding a tuner side wireless LAN I/F 22 to the tuner section 1 and adding a recording side wireless LAN I/F 23 to the recording section 2 in the television broadcast receiving device according to the second embodiment. Further, as a unit that monitors the wireless communication state between the tuner section 1 and the display section 3, a transmission state monitoring section 18 is provided to the tuner section 1 instead of the receiving state monitoring section 12 of the display section 3. Since the other parts of the constitution are the same as those in the second embodiment, the description thereof is omitted.

In the fourth embodiment, it is assumed that the wireless transmission from the tuner section 1 to the display section 2 is performed by using a band of 5 GHz that is used generally by the wireless LAN.

The tuner side wireless LAN I/F 22 conforms to the Standard IEEE 802.11a compatible with the band of 5 GHz, receives a video/audio signal wirelessly transmitted from the tuner section 1 to the display section 2 as a received signal as shown by a dotted line of FIG. 8, and is coupled with the recording side wireless LAN I/F 23 so as to transmit/receive a broadcast signal between the tuner section 1 and the recording section 2.

(Operation)

The transmission state monitoring section 18 acquires a video/audio signal before transmission from the wireless transmission section 8, receives a received signal from the tuner side wireless LAN I/F 22, and compares these signals so as to calculate a level of a disturbing signal present within a transmission band of the video/audio signal to be wirelessly transmitted from the wireless transmission section 8 to the wireless receiving section 13.

When the transmission state monitoring section 18 determines that the level of the disturbing signal exceeds a predetermined value as compared with the output level of the video/audio signal to be transmitted from the wireless transmission section 8, the wireless transmission from the tuner section 1 to the display section 3 cannot be normally performed. For this reason, the recording of the broadcast signal into the HDD 11 of the recording section 2 is started.

The recording of the broadcast signal in the recording section 2 is as described in the second embodiment. In the fourth embodiment, the network connection between the tuner section 1 and the recording section 2 is the wireless LAN connection established by the tuner side wireless LAN I/F 22 and the recording side LAN I/F 23, and the recording/playback controller 7 performs the recording and reading of the broadcast signal in/from the recording section 2 via the wireless LAN. Since the band of 5 GHz is used for the transmission of the video/audio signal from the tuner section 1 to the display section 3, for example, a band of 2.4 GHz (IEEE 802.11g or the like) is used for the wireless transmission/receiving to/from the recording section 2.

That is to say, when the level of the disturbing signal exceeds a predetermined value, the recording/playback controller 7 transmits the broadcast signal received from the digital demodulator 5 to the tuner side wireless LAN I/F 22. The tuner side wireless LAN I/F 22 transmits the broadcast signal to the recording side wireless LAN I/F 23 via the wireless LAN, and the recording side wireless LAN I/F 23 transmits the broadcast signal to the broadcast signal transmission/receiving section 9. As to the operation thereafter, as already described in the second embodiment, the broadcast signal is recorded in the HDD 11. Further, when the transmission state monitoring section 18 determines that the level of the disturbing signal becomes smaller than the predetermined value, the recording/playback controller 7 reads the broadcast signal recorded in the HDD 11 via the recording side wireless LAN I/F 23 and the tuner side wireless LAN I/F 22.

That is to say, in the television broadcast receiving device according to the fourth embodiment, the tuner section 1 has the wireless transmission section 8 that transmits a video/audio signal to the display section 3, the transmission state monitoring section 18 that receives the video/audio signal before transmission to the display section 3 in the wireless transmission section 8, and the tuner side wireless LAN I/F 22. The recording section 3 has the recording side wireless LAN I/F 23 that communicates with the tuner side wireless LAN I/F 22 through wireless LAN, and the HDD 11 as the storage device. The tuner side wireless LAN I/F 22 receives the video/audio signal to be wirelessly transmitted from the wireless transmission section 8 to the display section 3 as a received signal. The transmission state monitoring section 18 calculates the level of the disturbing signal within the transmission band based on the video/audio signal in the wireless transmission section 8 and the receiving signal. The tuner section 1 further has the recording/playback controller 7 that, when the level of the disturbing signal reaches the predetermined value or more value, transmits the receiving broadcast signal to the recording section 2 and records it therein, and when the level of the disturbing signal falls below the predetermined value, reads the broadcast signal recorded in the recording section 2. The broadcast signal read from the recording section 2 is wirelessly transmitted as a video/audio signal to the display section 3. The recording/playback controller 7 records and reads the broadcast signal in/from the HDD 11 via the tuner side wireless LAN I/F 22 and the recording side wireless LAN I/F 23. In the fourth embodiment, since a unit that monitors the receiving state of a video/audio signal does not have to be provided to the display section 3, the display section 3 can be simplified. Further, since the tuner side wireless LAN I/F 22 that receives a video/audio signal can be used also for the transmission/receiving of a broadcast signal to/from the recording section 2, wiring between the tuner section 1 and the recording section 2 is not necessary.

(Effect)

In the television broadcast receiving device according to the fourth embodiment, the tuner section 1 has the wireless transmission section 8 that transmits a video/audio signal to the display section 3, the transmission state monitoring section 18 that receives the video/audio signal before transmission to the display section 3 in the wireless transmission section 8, and the tuner side wireless LAN I/F 22. The recording section 3 has the recording side wireless LAN I/F 23 that communicates with the tuner side wireless LAN I/F 22 through wireless LAN, and the HDD 11 as the storage device. The tuner side wireless LAN I/F 22 receives the video/audio signal to be wirelessly transmitted from the wireless transmission section 8 to the display section 3 as a receiving signal. The transmission state monitoring section 18 calculates the level of the disturbing signal within the transmission band based on the video/audio signal in the wireless transmission section 8 and the receiving signal. The tuner section 1 further has the recording/playback controller 7 that, when the level of the disturbing signal reaches the predetermined value or more value, transmits the receiving broadcast signal to the recording section 2 and records it therein, and when the level of the disturbing signal falls below the predetermined value, reads the broadcast signal recorded in the recording section 2. The broadcast signal read from the recording section 2 is wirelessly transmitted as a video/audio signal to the display section 3. The recording/playback controller 7 records and reads the broadcast signal in/from the HDD 11 via the tuner side wireless LAN I/F 22 and the recording side wireless LAN I/F 23. In the fourth embodiment, since a unit that monitors the receiving state of a video/audio signal does not have to be provided to the display section 3, the display section 3 can be simplified. Further, since the tuner side wireless LAN I/F 22 that receives a video/audio signal can be used also for the transmission/receiving of a broadcast signal to/from the recording section 2, the wiring between the tuner section 1 and the recording section 2 is not necessary.

Fifth Embodiment (Constitution)

Figure 9:
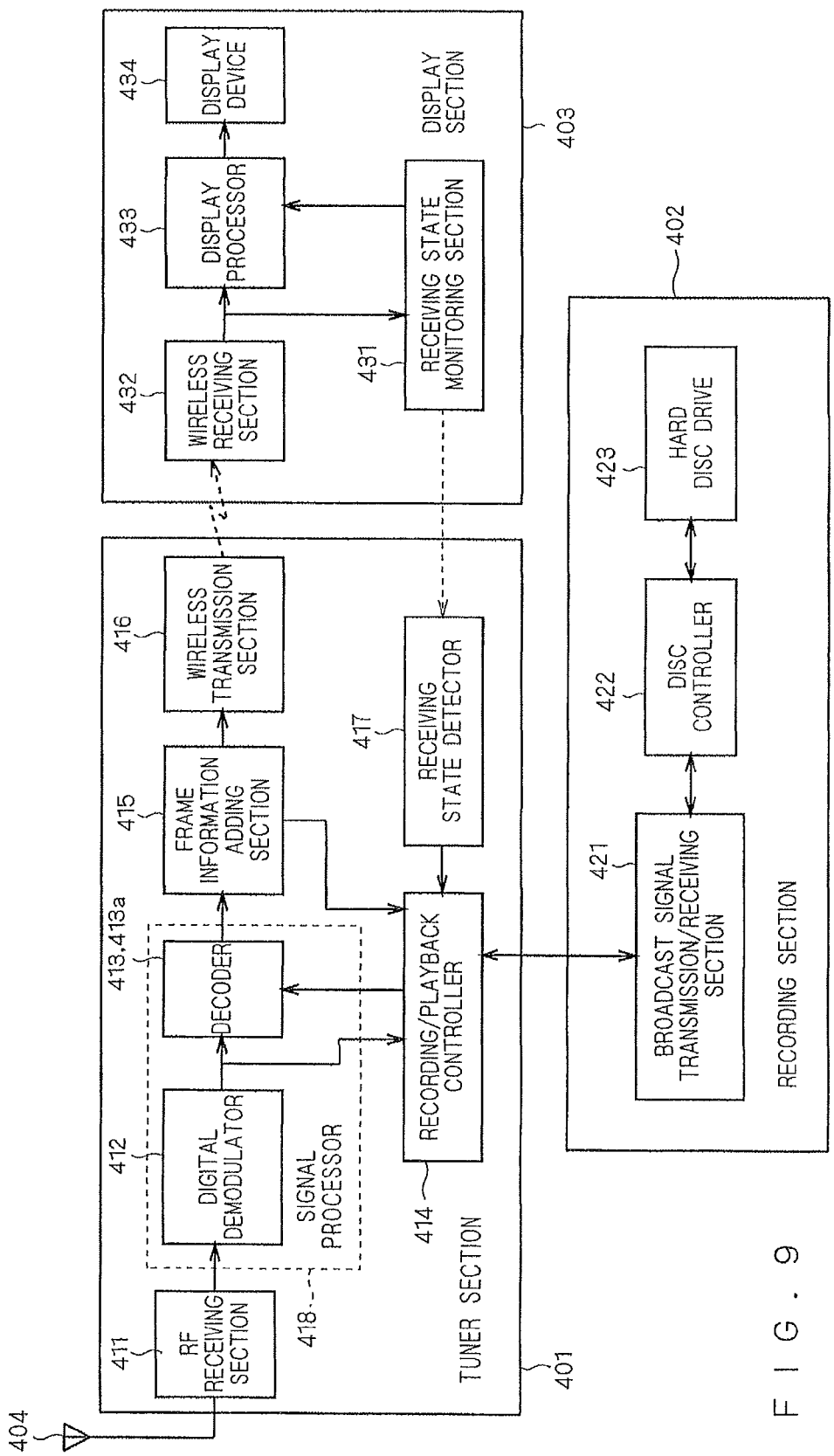
FIG. 9 is a constitutional diagram illustrating a television broadcast receiving device according to a fifth embodiment.

FIG. 9 is a block diagram schematically illustrating a constitution of the television broadcast receiving device according to a fifth embodiment. As shown in FIG. 9, the television broadcast receiving device according to the fifth embodiment has a tuner section 401, a recording section 402, and a display section 403 similarly to the second to fourth embodiments. The tuner section 401 receives a broadcast signal and wirelessly transmits a video/audio signal based on the received broadcast signal. The recording section 402 records the broadcast signal received by the tuner section 401. The display section 403 receives the video/audio signal wirelessly transmitted from the tuner section 401, and displays a video.

As shown in FIG. 9, the tuner section 401 has an RF receiving section (broadcast signal receiving section) 411, a signal processor 418 (a digital demodulator 412 and a decoder 413), a frame information adding section 415, a wireless transmission section 416, a recording/playback controller 414, and a receiving state detector 417. The RF receiving section 411 receives a broadcast signal. The signal processor 418 converts the broadcast signal into a video/audio signal with a format suitable for the display section. The frame information adding section 415 adds frame information indicating an order of frames to the frames of a video signal composing the video/audio signal. The wireless transmission section 416 wirelessly transmits the video/audio signal to which the frame information is added. The recording/playback controller 414 records the broadcast signal and the frame information in the recording section 402, and reads the broadcast signal recorded in the recording section 402. The receiving state detector 417 receives receiving state information in the display section 403 about the video/audio signal wirelessly transmitted from the wireless transmission section 416 from the display section 403.

The RF receiving section 411 receives an RF signal as a television broadcast signal input via an antenna 404 (or a network line or the like, not shown). The RF signal received by the RF receiving section 411 is digitally modulated by a VSB (vestigial sideband) modulating system, a QAM (quadrature amplitude modulation) system, or an OFDM (orthogonal frequency division multiplexing) system. The digital demodulator 412, demodulates the RF signal from the RF receiving section 411, and outputs the demodulated broadcast signal. The decoder 413 receives the broadcast signal output from the digital demodulator 412, restores the original signal from the compressed broadcast signal, and outputs it as a video/audio signal. The restored video/audio signal is wirelessly transmitted to a wireless receiving section 432 of the display section 403 from the wireless transmission section 416, and a video is displayed on a display device 434 of the display section 403 based on the wirelessly transmitted video/audio signal. The frame information adding section 415 receives the video/audio signal output from the decoder 413, and adds frame information indicating a temporal position of a frame (for example, a video frame that is started to be transmitted by the wireless transmission section 416 has the frame number "0", and thereafter, frame numbers of video frames are higher than the previous number by one) to a signal to be wirelessly transmitted to the display section 403. The wireless transmission section 416 receives the video/audio signal to which the frame numbers are added from the frame information adding section 415, and wirelessly transmits the received video/audio signal to the display section 403.

The recording/playback controller 414 controls the operation of the recording section 402, transmits the broadcast signal output from the digital demodulator 412 to the recording section 402 to record it in the recording section 402, and reads the broadcast signal recorded in the recording section 402 as the need arises.

As shown in FIG. 9, the display section 403 has a wireless receiving section 432, a display device 434, a display processor 433, and a receiving state monitoring section 431. The wireless receiving section 432 receives a video/audio signal wirelessly transmitted from the wireless transmission section 416. The display device 434 displays a video. The display processor 433 displays a video on the display device 434 based on the video/audio signal received by the wireless receiving section 432. The receiving state monitoring section 431 transmits receiving state information about the video/audio signal received by the wireless receiving section 432 to the receiving state detector 417.

The display processor 433 has a frame buffer for at least one frame, receives the video/audio signal from the wireless receiving section 432, and converts the received video/audio signal into a signal suitable for display on the display device 434. The display device 234 is, for example, a LCD or a plasma display panel, and displays a video based on the video signal received from the display processor 433. The receiving state monitoring section 431 monitors a receiving state of the video/audio signal in the wireless receiving section 432, and monitors frame information inserted by the frame information adding section 415 of the tuner section 401 so as to check if a continuous frame can be replayed. In other words, the receiving state monitoring section 431 determines whether missing of a frame is caused in the video/audio signal received by the wireless receiving section 432, and when the missing of a frame is caused, it transmits the determined result including frame information about the missing frame as the receiving state information to the receiving state detector 417.

As shown in FIG. 9, the recording section 402 has a broadcast signal transmission/receiving section 421, a disc controller 422, and a hard disc drive (HDD) 423.

The broadcast signal transmission/receiving section 421 receives a broadcast signal from the tuner section 401, and outputs the broadcast signal to the disc controller 422. The disc controller 422 writes the broadcast signal received from the broadcast signal transmission/receiving section 421 into the HDD 423. Further, the disc controller 422 reads the broadcast signal from the HDD 423 as the need arises, and outputs the read broadcast signal to the broadcast signal transmission/receiving section 421. The broadcast signal transmission/receiving section 421 transmits the read broadcast signal to the recording/playback controller 414. The case where the recording medium in the recording section 202 is HDD is described, but the recording medium may be another kind of a recording medium such as a semiconductor memory as long as it can record a broadcast signal therein.

The operation of the television broadcast receiving device according to the fifth embodiment is described below. The RF receiving section 411 receives a television broadcast signal input from the antenna 404 as an RF signal. The digital demodulator 412 demodulates the RF signal and outputs the demodulated signal as a broadcast signal. The broadcast signal here is a digital video/audio signal compressed according to the MPEG standard or the like. The broadcast signal output from the digital demodulator 412 is decoded by the decoder 413, converted into a video/audio signal as a base-band signal, and the converted video/audio signal is input into the frame information adding section 415. The frame information adding section 415 adds frame information indicating the temporal positions of respective frames to the video/audio signal. For example, the frame information adding section 415 gives the frame number "0" to a video frame that is first transmitted by the wireless transmission section 416, and thereafter gives frame numbers higher than the previous frame number by one to the video frames. The video/audio signal to which the frame numbers are given is wirelessly transmitted from the wireless transmission section 416 to the display section 403.

The digital broadcast mostly adopts the MPEG standard, and in this case, moving image data is decoded in terms of GOP (Group of Pictures) composed of a predetermined number of pictures. Therefore, when the frame numbers are given to the respective frames in frame numerical order, a range of the frame number of each GOP can be acquired. For this reason, the recording/playback controller 414 may give the frame number of the first frame in GOP as addition information to the broadcast signal, and may transmit the broadcast signal with that frame number to the recording section 202. Further, the frame number of the first frame in GOP may be given as addition information for each GOP, or the frame number of the first frame in GOP may be added as addition information for a predetermined number of GOPs. The frame information given to the broadcast signal to be recorded in the recording section 402 by the recording/playback controller 414 corresponds to the frame information given to the video/audio signal to be wirelessly transmitted by the frame information adding section 415.

In the display section 403, the wireless receiving section 432 receives the video/audio signal wirelessly transmitted from the wireless transmission section 416 of the tuner section 401, and the display processor 433 converts the video/audio signal into a signal format suitable for the display on the display device 434. The converted video/audio signal is input from the display processor 433 to the display device 434, and a video is displayed on the display device 434 based on the video/audio signal.

The receiving state monitoring section 431 monitors the receiving state of the wireless transmission in the wireless receiving section 432, and determines whether the receiving state is excellent or defective. In the method for determining the receiving state, for example, an error detection code is inserted into a video/audio signal in the wireless transmission section 416, and an error rate in the wireless receiving section 432 is calculated. Further in this method, when the calculated error rate is not more than a predetermined value, the receiving state is determined as excellent, and when the error rate exceeds the predetermined value, the receiving state is determined as defective.

The receiving state monitoring section 431 acquires the determined result of the receiving state, acquires the frame information given to the video/audio signal received by the wireless receiving section 432 from the video signal received by the wireless receiving section 432, and determines whether all the frames are normally received. For example, when the frame number "0" is given to the video frame that is first transmitted by the wireless transmission section 416 and thereafter the frame numbers higher than the previous frame numbers by one are given to the frames, the receiving state monitoring section 431 checks if the frames of the received video signal continue. When the received frames do not continue, the receiving state monitoring section 431 detects that missing of frames occurs. When the missing is detected, the receiving state monitoring section 431 accumulates frames just before the missing is detected into the display processor 433, and transmits the frame number of the missing frame to the receiving state detector 417 of the tuner section 401 in a wireless or wired manner. When the receiving state monitoring section 431 is constituted so as to wirelessly transmit the frame number of the missing frame, it has a wireless transmission unit, and the receiving state detector 417 has a wireless receiving unit.

When the receiving state monitoring section 431 determines the state of the wireless communication as defective, the display processor 433 transmits a frame received normally before the defective state of the wireless communication as a still image to the display device 434.

When the receiving state detector 417 receives the determined result in the receiving state monitoring section 431 and detect missing of a frame, it instructs the recording/playback controller 414 to prepare for starting of playback from the missing frame according to the broadcast signal recorded in the recording section 402. For this reason, the recording/playback controller 414 sets the operation so that a broadcast signal for the time, that is longer than at least maximum time required for posting of the missing of the video signal output from the decoder 413 to the receiving state detector 417, namely, total delay time (maximum delay time) obtained by adding a delay due to the other processes to a decoding delay and a delay due to the wireless transmission, is always recorded in the recording section 402. When the missing of a frame occurs, the recording continues until the wireless transmission from the tuner section 401 to the display section 403 is started. That is to say, the recording section 402 records a signal for at least the maximum delay time, and when the wireless transmission from the tuner section 401 is restarted, the wireless transmission of the video/audio signal of a frame that is not normally received through the wireless transmission is started. For this reason, the display processor 433 can restart the display of a frame next to a frame retained in the display processor 433, and thus the missing of display contents does not occur.

After the normal wireless transmission is interrupted, when the state of the normal wireless transmission between the tuner section 401 and the display section 403 is recovered, namely, the receiving state is determined as excellent by the receiving state detector 417, the recording/playback controller 414 instructs the recording section 402 to replay a broadcast signal recorded in the HDD 423 while continuing record of the broadcast signal. As a result, the broadcast signal is read from the HDD 423 into the broadcast signal transmission/receiving section 421 via the disc controller 422, and is transmitted to the recording/playback controller 414. The stream of the replayed broadcast signal is transmitted to the decoder 413 and is decoded instead of the output from the digital demodulator 412. Thereafter, the broadcast signal read from the recording section 202 undergoes the similar process to the broadcast signal output from the digital demodulator 412, and is wirelessly transmitted as the video/audio signal from the wireless transmission section 416 to the display section 403.

When display processor 433 makes the display device 434 display a still image of the normally received video, the display is restarted from a frame having the frame number next to that of the frame of the displayed still image. For this reason, the video can be displayed on the display device 434 smoothly.

In the fifth embodiment, the recording/playback controller 414 may make a control so that the receiving state of the wireless communication is excellent, the video/audio signal is wirelessly transmitted, and the broadcast signal displayed on the display device 434 is erased from the HDD 423. Further, the broadcast signal corresponding to the maximum delay time is normally accumulated in a buffer memory (not shown) provided separately from the HDD 423, and may be recorded in the HDD 423 only when long-time recording is necessary until the normal wireless transmission can be restarted (when the capacity of the buffer memory is insufficient).

Further, in order to reduce the necessary storage capacity, the signal to be accumulated in the recording section 402 is recorded generally in a format of a stream before decoding, in the case of the digital television broadcast receiving, the MPEG2 stream. Since the decoding process in the decoder 413 should be executed first on a head frame of GOP, in order to wirelessly transmit a frame with a frame number whose wireless transmission is defective from the wireless transmission section 416, the GOP including this frame is decoded to prepare for restarting of the wireless transmission of this frame until the wireless state is recovered.

In the fifth embodiment, time may be used as frame information to be added in the frame information adding section 415. The time to be added by the frame information adding section 415 includes current time, and PTS (Presentation Time Stamp) to be used by the MPEG decoding. In this case, since the time information to be used for the decoding of the MPEG-compressed video/audio signal can be used instead of a frame number, the number of frames does not have to be counted.

The television broadcast receiving device according to the fifth embodiment has the tuner section 401, the display section 403 and the recording section 402. When the missing of a frame is detected, the display section 403 posts the missing frame to the tuner section 1. The tuner section 401 reads a stream accumulated in the recording section 402 from the missing frame based on the frame information sent from the display section 403, and decodes the read frame so as to send it to the display section 403. For this reason, the display of a video can be restarted so as to be connected smoothly to the screen of the display section 403 that is frozen while the communication state between the tuner section 401 and the display section 403 is defective. For this reason, according to the television broadcast receiving device according to the fifth embodiment, even if a period for which the wireless transmission cannot be normally carried out is present, a viewer can view a continued portion of the television broadcast after the recovery of the wireless transmission state. Therefore, the viewer does not miss the viewing of a part or the whole of the television broadcast.

Sixth Embodiments

A constitution of the television broadcast receiving device according to the sixth embodiment can be applied also to any of the television broadcast receiving devices according to the first to fifth embodiment, but an example where the constitution is applied to the television broadcast receiving device according to the first embodiment shown in FIG. 3 is described.

Figure 10:
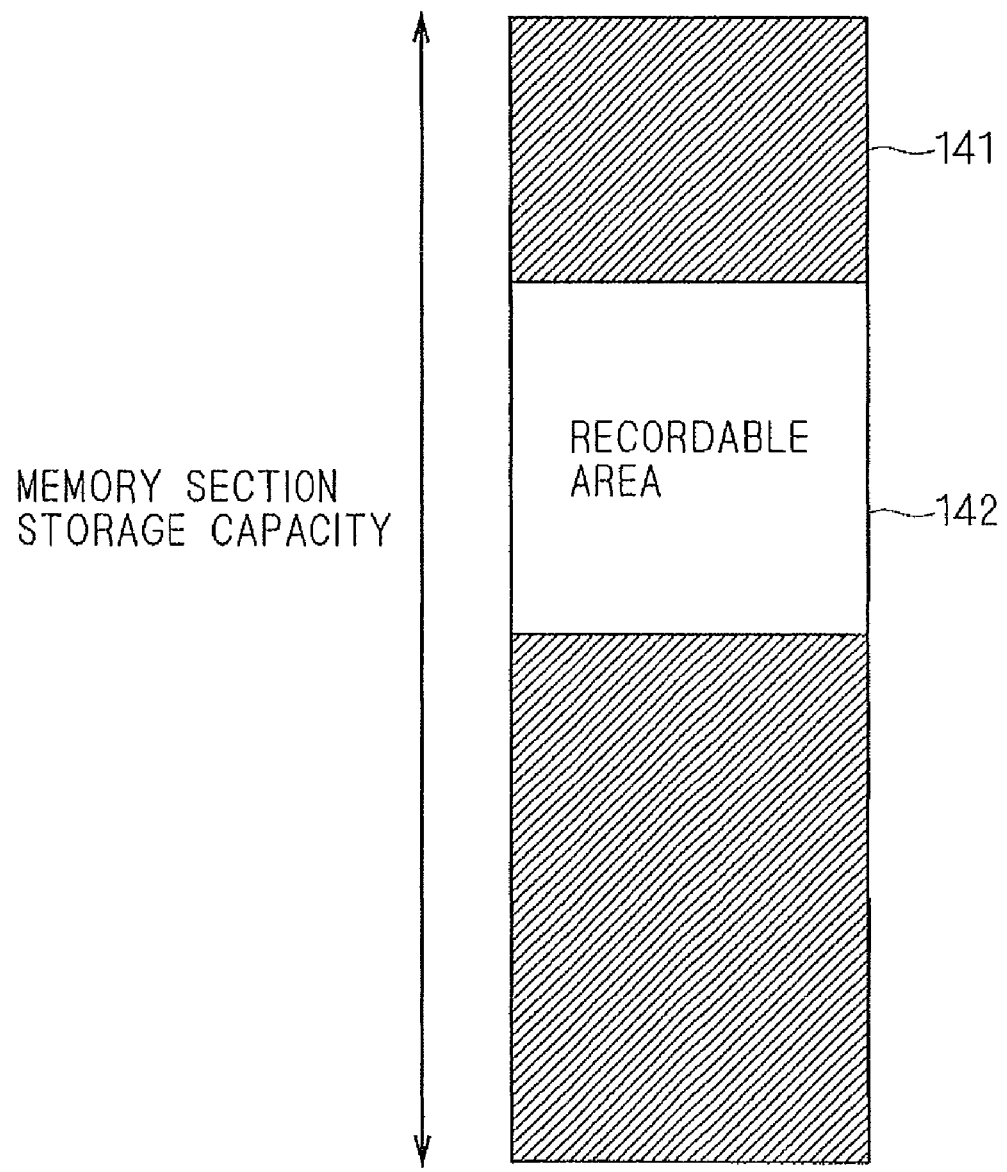
FIG. 10 is a diagram illustrating a recordable area of a memory section.

In the television broadcast receiving device according to the sixth embodiment, when the communication state between the tuner section 100 and the display section 200 is defective, the video data 121 from the video/audio input section 101 is recorded in the memory section 107, more specifically, in a recordable area within a determined range in the storage capacity 141 of the memory section 107. This concept is shown in FIG. 10. Loop recording is performed in a recordable area 142 allocated to a part of the storage capacity 141 of the memory section 107.

Figure 11:
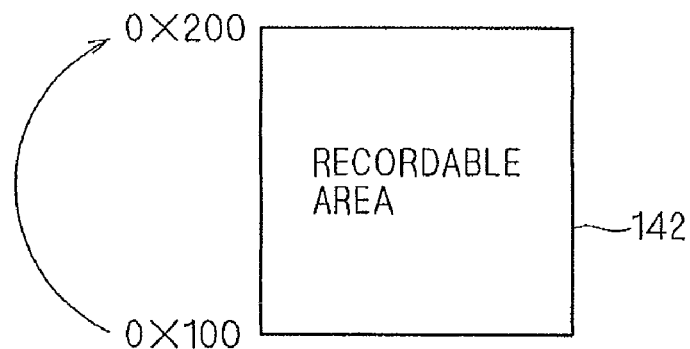
FIG. 11 is an explanatory diagram illustrating loop recording.
Figure 12:
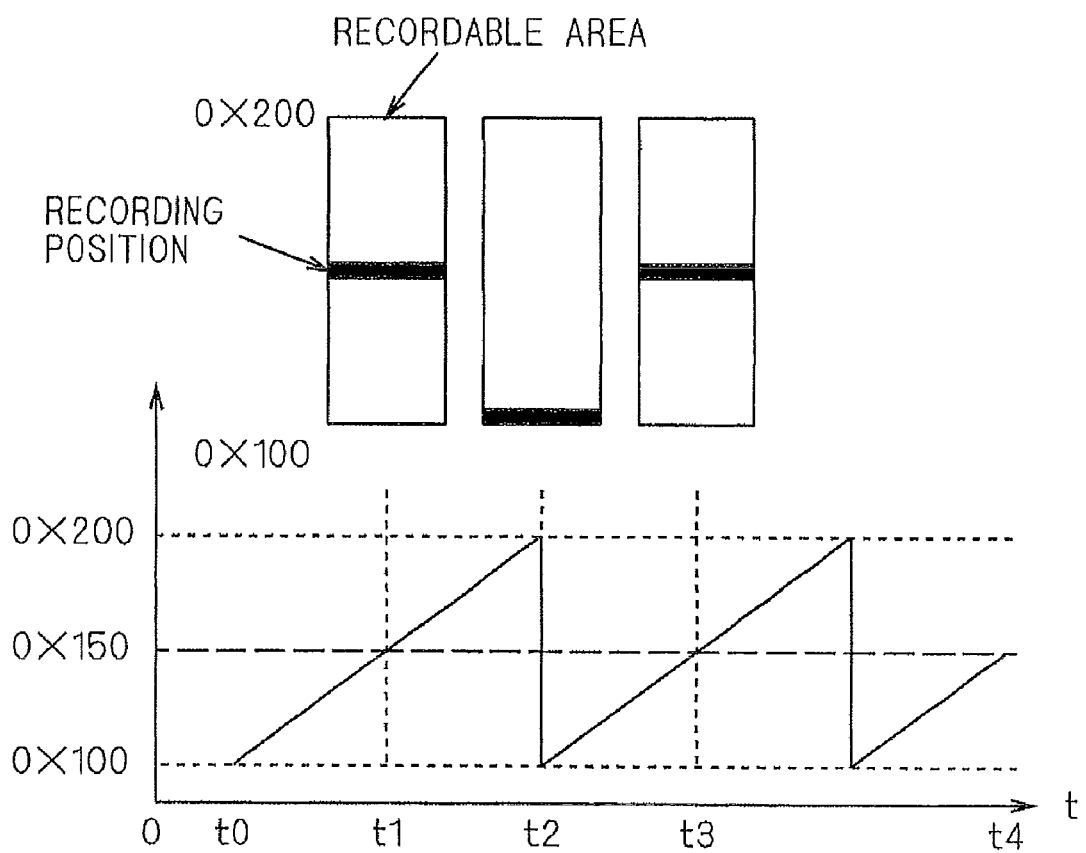
FIG. 12 is an explanatory diagram illustrating the loop recording.

The loop recording is described with reference to FIGS. 11 and 12. In FIG. 11, addresses 0x100 to 0x200 are allocated to the recordable area 142. The recording begins at address 0x100, and thereafter the recording is performed at addresses 0x101, 0x102 . . . . When recording data is written at address 0x200, the next address is 0x201, but since the recordable area 142 includes up to the address 0x200, recording data cannot be recorded at the address 0x201. For this reason, a next recording address returns to the address 0x100, the recording data originally recorded there is destroyed, and new recording data is recorded there.

This state is described with reference to FIG. 12. In a lower part of FIG. 12, the time is plotted along a horizontal axis, and the address of the recordable area 142 of the memory section 107 is plotted along a vertical axis. An upper part of FIG. 12 illustrates a recording position in the recordable area 142 at the time illustrated in the lower part.

When the communication state becomes defective and recording starts at t0, recording data is recorded at the address 0x100. The address shifts to higher numbers according to the recording, and recording data is recorded at address 0x150 at t1. When the recording continues and the recording area reaches the address 0x200 at t2, the recording area returns to the address 0x100. That is to say, after the address 0x200, the recording is performed at the address 0x100. At this time, the recording data recorded at the address 0x100 at t0 is destroyed, and the recording data at t2 is recorded at the address 0x100. Further, the recording continues and is performed at the address 0x150 at t3. Similarly, after the data recorded at t0 to t1 are destroyed, and the recording from t2 to t3 is performed. This operation repeats until the recording is stopped.

At the time of playback, loop playback is performed. The loop playback is described with reference to FIG. 11. The playback begins at the address 0x100 similarly to the recording. The playback area shifts to the addresses 0x101, 0x102 . . . according to the playback. When the playback address reaches 0x200 and the recording data at the address 0x200 is read, next playback is performed at the address 0x100. When the data recorded in the address does not change, the same data is replayed repeatedly. However, since new data is recorded at one address as the time passes due to the loop recording, new data is replayed.

Figure 13:
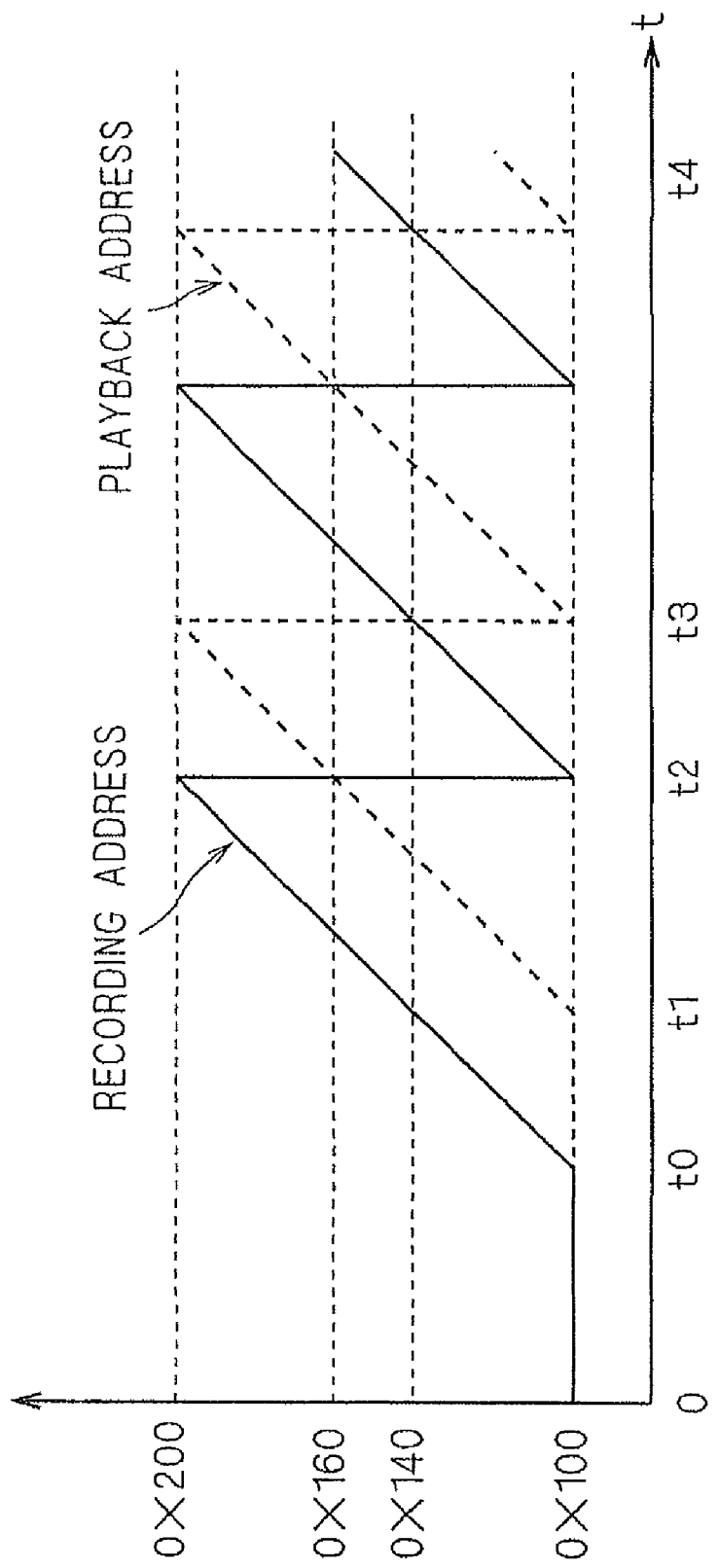
FIG. 13 is a diagram illustrating a relationship between the loop recording and loop playback.

FIG. 13 illustrates a relationship between the recording address and the playback address, namely, a relationship between the loop recording and the loop playback. The communication state becomes defective at to, and the recording starts at the address 0x100. The display section 200 outputs an image before the defective communication state or an image showing the defective communication to the display device 300. When the communication state becomes excellent at t1, the recording/playback section 106 starts playback from the memory section 107. At this time, the playback starts at the address 0x100. The recording address at t1 is 0x140. The recording address returns to the address 0x100 at t2, and while the data recorded at t0 is being destroyed at each address, the recording continues. The playback address at t2 is 0x160, and this is different from the recording address at t2. Since before recording is performed at all the recording addresses and new data is written, playback is performed, data to be replayed is not destroyed by the recording. The playback addresses reaches the address 0x200 and the next playback address is 0x100 at t3. At this time point, since the data before t2 are destroyed and data after t2 are newly recorded, the tuner section 100 can read continuous recording data. The recording and the playback are performed by repeating this operation. When the user changes a playback channel or turns off the power at t4, the recording and the playback are stopped.

That is to say, in the television broadcast receiving device according to the sixth embodiment, the recording/playback section 106 records the video data 121 in the memory section 107 through the loop recording, and replays the video data 121 from the memory section 107 through the loop playback. As a result, continuity of the playback can be secured, and the storage capacity of the memory section 107 can be saved.

The loop recording and the loop playback are performed in a part of the storage capacity of the memory section 107. As a result, the storage capacity of the memory section 107 can be saved.

(Effect)

In the television broadcast receiving device according to the sixth embodiment, the recording/playback section 106 records the video data 121 in the memory section 107 through the loop recording, and replays the video data 121 from the memory section 107 through the loop playback. As a result, the continuity of the playback can be secured, and the storage capacity of the memory section can be saved.

Further, in the television broadcast receiving device according to the sixth embodiment, the loop recording and the loop playback are performed in a part of the storage capacity of the memory section 107. As a result, the storage capacity of the memory section can be saved.

Seventh Embodiment (Constitution)

The television broadcast receiving device according to the seventh embodiment can be applied also to the television broadcast receiving devices according to the first to sixth embodiments, but it is applied to the constitution of the television broadcast receiving device according to the second embodiment shown in FIG. 6 and this application is described as one example. In the television broadcast receiving device according to the seventh embodiment, the decoder 6 (see FIG. 6) that decodes a broadcast signal as a video/audio signal is provided with a function for shortening a playback time of a broadcast signal received from the recording/playback controller 7.

Figure 14:
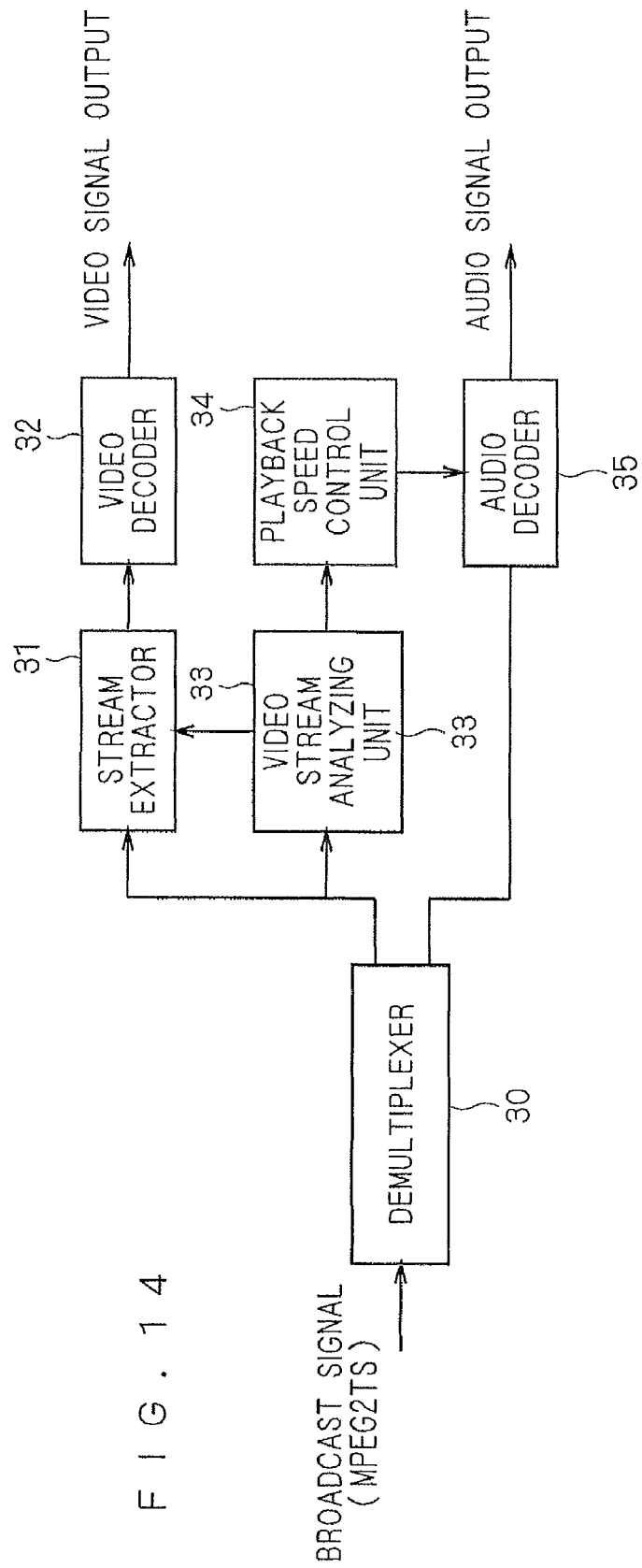
FIG. 14 is a constitutional diagram illustrating a decoder 6 according to a seventh embodiment.

FIG. 14 is a block diagram illustrating a constitution of the decoder 6 according to the seventh embodiment.

The decoder 6 has a demultiplexer 30, a stream extracting unit 31, a video decoder 32, a video stream analyzing unit 33, a playback speed control unit 34, and an audio decoder 35.

The demultiplexer 30 receives a broadcast signal obtained by multiplexing a video signal and an audio signal from the recording/playback controller 7, and separates the broadcast signal into a video stream and an audio stream. The video stream analyzing unit 33 receives the video stream from the demultiplexer 30, and analyzes the video stream so as to determine a stream position to be extracted. The stream extracting unit 31 receives the video stream from the demultiplexer 30, and clips a part of the video stream into a decodable format (namely, the stream is thinned out). The video decoder 32 receives the video stream from the stream extracting unit 31, and decodes the video stream according to the MPEG2 standard.

The audio decoder 35 receives the audio stream from the demultiplexer 30, and decodes the audio stream as the audio signal according to the MPEG2 standard. At this time, a clock frequency is adjusted under the control of the playback speed control unit 34 so that the decoding is performed according to the playback speed of the video signal to be decoded by the video decoder 32.

That is to say, in the television broadcast receiving device according to the seventh embodiment, the tuner section 1 has the decoder 6 that decodes a broadcast signal, and the decoder 6 thins out frames at a constant rate from the stream of the broadcast signal read by the recording/playback controller 7 to decode the thinned-out frames, and outputs the decoded frames as the video/audio signal. The television broadcast during the interruption of viewing is recorded by the recording section 2, and after the communication state is recovered, the television broadcast is read and replayed. However, this television broadcast is replayed at a high speed so as to be capable of catching up with actual broadcast, and thus the recording of the thereafter broadcast is not necessary.

Further, the decoder 6 has a separating unit 30, a stream extracting unit 31, a video decoder 32, an audio decoder 35, and a playback speed control unit 34. The separating unit 30 separates a broadcast signal into a video stream and an audio stream. The stream extracting unit 31 extracts a part of the video stream. The video decoder 32 decodes the extracted video stream as a video signal. The audio decoder 35 decodes the audio signal as an audio signal. The playback speed control unit 34 allows playback of the video signal to synchronize with playback of the audio signal, and outputs a video/audio signal. Television broadcast during interrupt of viewing is read and replayed after the communication state recorded in the recording section 2 is recovered, but this broadcast is replayed at high speed so as to be capable of catching up with actual broadcast. As a result, recoding of thereafter broadcast is not necessary.

(Operation)

Figure 15:
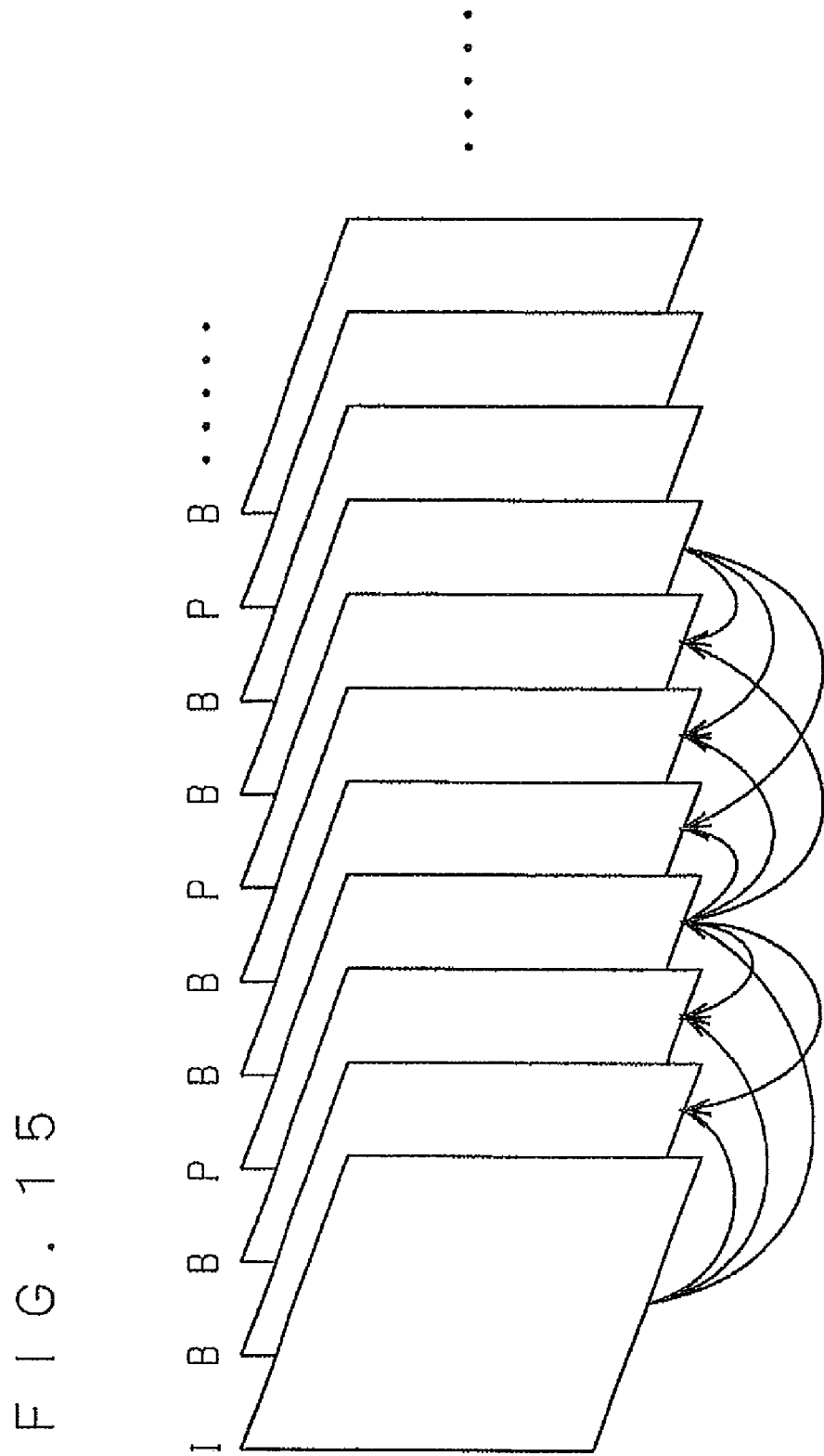
FIG. 15 is a diagram illustrating each frame of a video stream.

FIG. 15 is a drawing illustrating each frame of a video stream. The video stream of a broadcast signal encoded by the MPEG2 format is separated into three kinds of frames I, B and P as shown in FIG. 15, and the frames are encoded. I indicates an intra-frame, it is encoded so as to close into the frame, and is decoded without depending on the other frames, so that a frame screen can be obtained. P indicates a prediction frame and a difference between frames is encoded through motion compensation prediction from a precedent I or P frame. For this reason, the P frame for 1 frame can be encoded at data amount less than that of the I frame closed within the frame. Further, B indicates a bidirectional prediction frame, and it is encoded so as to be maximum amount of data based on the motion compensation prediction from both directions of I or P frame just before the B frame or I or P frame right after the B frame.

In order to heighten the playback speed, the frames are thinned out at a constant rate from the frames to be decoded. For example, since the playback speed of a broadcast signal is 30 frames/sec, if one frame is thinned out per second, the playback proceeds at 30/29-time speed.

The frames may be thinned out from a decoded video signal, but when the playback speed is heightened, the decoder should operate faster accordingly. As a result, the video decoder 32 which operates at higher speed than normal playback is necessary. Therefore, in the seventh embodiment, after frames are thinned out, the decoding is performed.

The operation of the decoder 6 is described below. A broadcast signal input into the demultiplexer 30 from the digital demodulator 5 is separated into a video stream and an audio stream. The video stream is sent to the video stream analyzing unit 33, and a stream portion corresponding to a frame to be eliminated is determined. The video stream analyzing unit 33 calculates a number of frames to be thinned out per constant cycle based on the playback speed instruction sent from the playback speed control unit 34.

When I and P frames are thinned out, continued P and B frames cannot be decoded, and a video cannot be displayed until next I frame. For this reason, a B frame is subject to be thinned out, and when no B frame is present, the video stream analyzing unit 33 instructs the stream extracting unit 31 to thin out a P frame just before an I frame.

The stream extracting unit 31 thins out frames according to the instruction from the video stream analyzing unit 33, and the decoder 32 decodes the thinned-out video stream.

When the video decoder 32 sequentially decodes an input stream and detects drop of a frame, it jumps to data of next frame so as to continue the decoding. At this time, when the video stream is continuously input into the stream extracting unit 31 at a constant rate such as at 30 frames/second, the playback speed can be adjusted according to a percentage of frames that are dropped by the stream extracting unit 31. On the other hand, the clock frequency of the audio decoder 35 is heightened so that the decoding speed of an audio is heightened accordingly. The playback speed control unit 34 controls the playback of both a video and an audio so that the decoding is performed at a speed at which the video and the audio synchronize with each other.

(Effect)

That is to say, in the television broadcast receiving device according to the seventh embodiment, the tuner section 1 has the decoder 6 that decodes a broadcast signal, and the decoder 6 thins out frames at a constant rate from the stream of the broadcast signal read by the recording/playback controller 7 to decode the tinned-out frames, and outputs the decoded frames as the video/audio signal. The television broadcast during the interrupt of viewing is recorded by the recording section 2, and after the communication state is recovered, the television broadcast is read and replayed. However, this television broadcast is replayed at high speed so as to be capable of catching up with actual broadcast, and thus the recording of the thereafter broadcast is not necessary.

Further, the decoder 6 has the demultiplexer 30 as the separating unit, the stream extracting unit 31, the video decoder 32, the audio decoder 35, and the playback speed control unit 34. The demultiplexer 30 separates a broadcast signal into a video stream and an audio stream. The stream extracting unit 31 extracts a part of the video stream. The video decoder 32 decodes the extracted video stream as the video signal. The audio decoder 35 decodes the audio stream as the audio signal. The playback speed control unit 34 allows the playback of the video signal to synchronize with the playback of the audio signal, and outputs the video/audio signal. The television broadcast during interrupt of viewing is recorded in the recording section 2, and after the communication state is recovered, this television broadcast is read and replayed. When high-speed playback is performed, this television broadcast can catch up with actual broadcast, and the recording thereafter broadcast is unnecessary.

Eighth Embodiment

Figure 16:
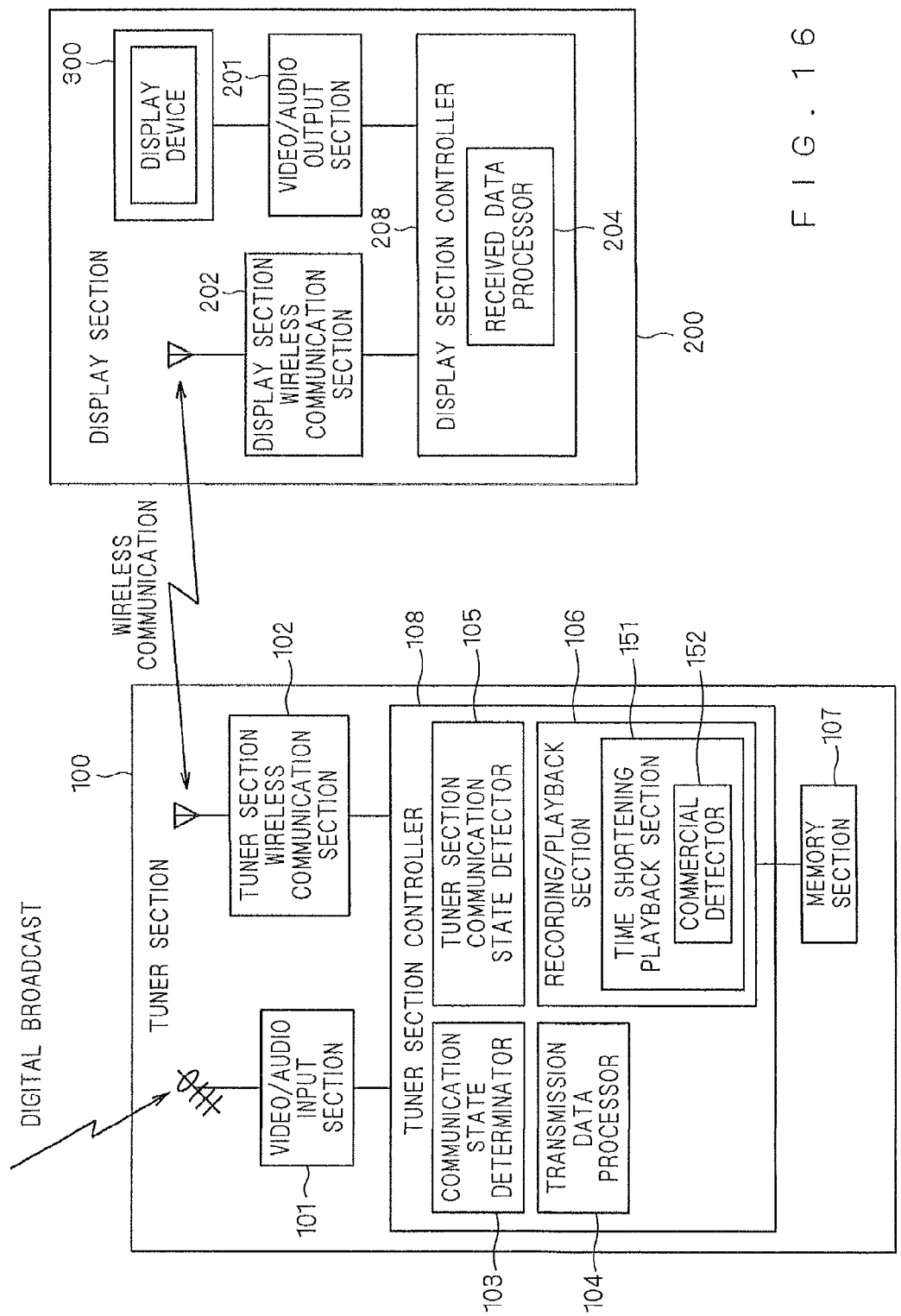
FIG. 16 is a constitutional diagram illustrating a television broadcast receiving device according to an eighth embodiment.

FIG. 16 illustrates a constitution of the television broadcast receiving device according to an eighth embodiment. The eighth embodiment is approximately the same as the first embodiment, and only difference is that the time shortening playback section 151 is provided with a commercial detector 152. Since the other parts of the constitution and the operation are similar to those in the first embodiment, the description thereof is omitted.

In the television broadcast receiving device according to the eighth embodiment, the commercial detector 152 detects a commercial portion from a main story of broadcast, and replays only the commercial at high speed. A principle of the high-speed playback is as described in the seventh embodiment.

Figure 17:
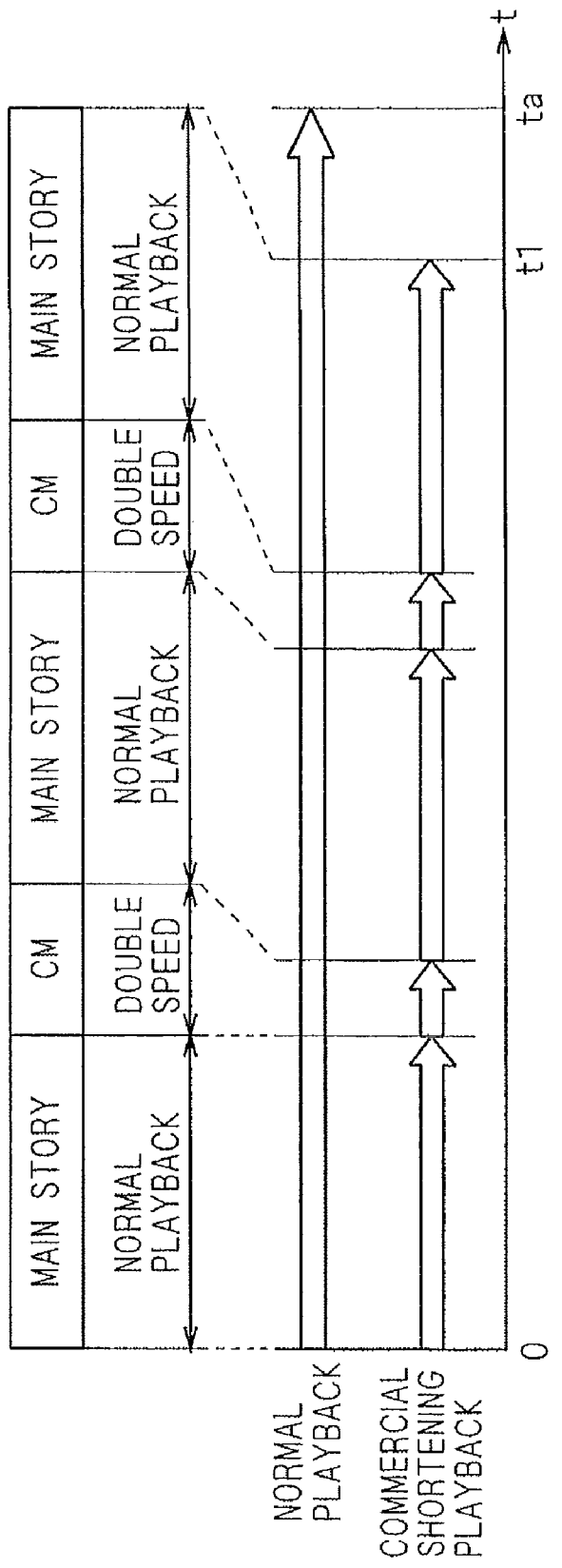
FIG. 17 is a diagram illustrating a state of replaying a commercials portion at double speed.

For example, in terrestrial digital broadcast, commercial is inserted into a main story in one program and the program is broadcasted. In FIG. 17, two commercials are inserted into a program at time ta. When the commercial detector 152 analyzes the playback video data 123 from the memory section 107 and detects commercials, it replays only the commercial portions at high speed. FIG. 17 illustrates a state that the commercial portions are replayed at double speed. Normal playback requires time ta, but the time required for the high-speed playback is shortened to time t1.

FIG. 18 illustrates an operation before the defective communication state becomes excellent and the playback video data 123 synchronizes with digital broadcast. Elapsed time is plotted along a horizontal axis, and time difference between the playback position and a playback position where the receiving state is excellent is plotted along a vertical axis. While the communication with the display section 200 is excellent (from time 0 to t1), the recording is not performed, the video data 121 is converted into processed video data 122 and the processed video data 122 is transmitted to the display section 200. For this reason, time difference between the playback and the broadcast is not present. When the communication state is determined as defective at t1 while the receiving of the digital broadcast, the video data 121 is recorded in the memory section 107. The broadcast contents at this time are not commercial but a main story. While the communication state is defective, the time difference between the defective state and the excellent state (broadcast) increases in proportional to the time passing. When the communication state is determined as excellent at t2, the playback video data 123 is started to be read from the memory section 107. Since the main story is broadcasted at t1 at which the receiving state becomes defective, the main story is normally replayed at t2. The recording is continuously performed. The commercial detector 152 detects commercials at t3, and replays the commercials at, for example, double speed. The double-speed playback reduces the time difference between the broadcast and the playback video data 123. When the commercial detector 152 detects no commercial and checks that a main story is read from the memory section 107 at t4, the double-speed playback is ended, and the playback is returned to normal one. Thereafter, the normal playback continues, and when the commercial detector 152 detects commercials at t5, it replays the commercials at the double speed. The time shortening playback section 151 detects that the video data 121 synchronizes with the playback video data 123 at t6. That is to say, the time difference between the playback video data 123 and the broadcast (video data 121) becomes 0. At this time, the input data selector 111 selects the video data 121 as an input, and the recording/playback section 106 stops the recording in the memory section 107 and the playback from the memory section 107.

Figure 19:
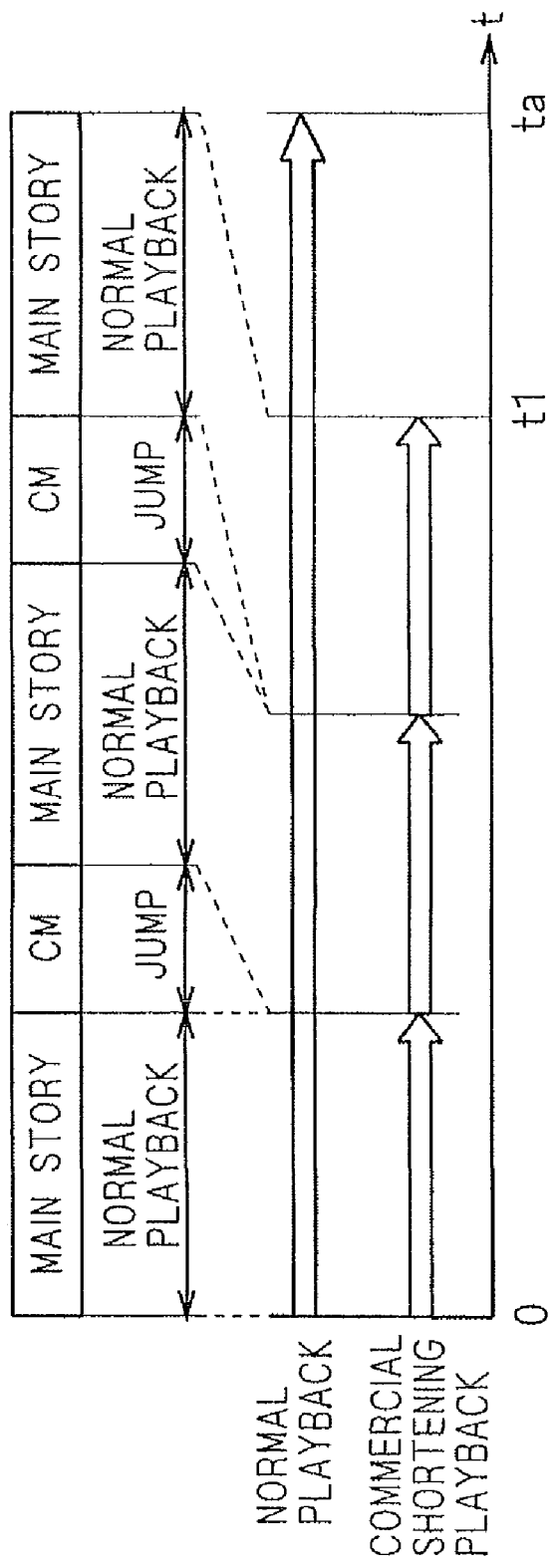
FIG. 19 is a diagram illustrating an operation of the television broadcast receiving device according to the eighth embodiment.

The eighth embodiment describes the example that a commercial portion is replayed at the high speed. However, in order that the playback synchronizes earlier with digital broadcast being received originally, when the commercial detector 152 detects commercials as shown in FIG. 19, the playback jumps the commercial portion to a next main story so that the playback may be performed.

That is to say, in the television broadcast receiving device according to the eighth embodiment, the recording/playback section 106 detects commercials from the playback video data 123, and temporarily compresses only the commercials so as to read the commercials at high speed. When the playback video data 123 to be read by the recording/playback section 106 catches up with the video data 121, the recording in the memory section 107 and the reading from the memory section 107 are stopped. When the commercial detector 152 is provided to the time shortening playback section 151 of the recording/playback section 106, the commercial detector 152 detects commercials from the playback video data 123 from the memory section 107, and thus only the commercial portions can be replayed at high speed. For this reason, the delay during the defective communication can be recovered, and the user can understand the main part more easily than a case where all the main part and the commercials are replayed at high speed.

(Effect)

In the television broadcast receiving device according to the eighth embodiment, the recording/playback section 106 detects commercials from the playback video data 123, and temporarily compresses only the commercials and reads only the commercials at high speed. When the playback video data 123 to be read by the recording/playback section 106 catches up with the video data 121, the recording/playback section 106 stops the recording in the memory section 107 and the reading from the memory section 107. Since the commercial detector 152 is provided to the time shortening playback section 151 of the recording/playback section 106, the commercial detector 152 can detect commercials from the playback video data 123 from the memory section 107, and can replay the commercial portions at high speed. For this reason, a delay during the occurrence of the defective communication can be recovered, and the user can understand the main portion more easily than the case where all the main portion and commercials are replayed at high speed.

Ninth Embodiment

Figure 20:
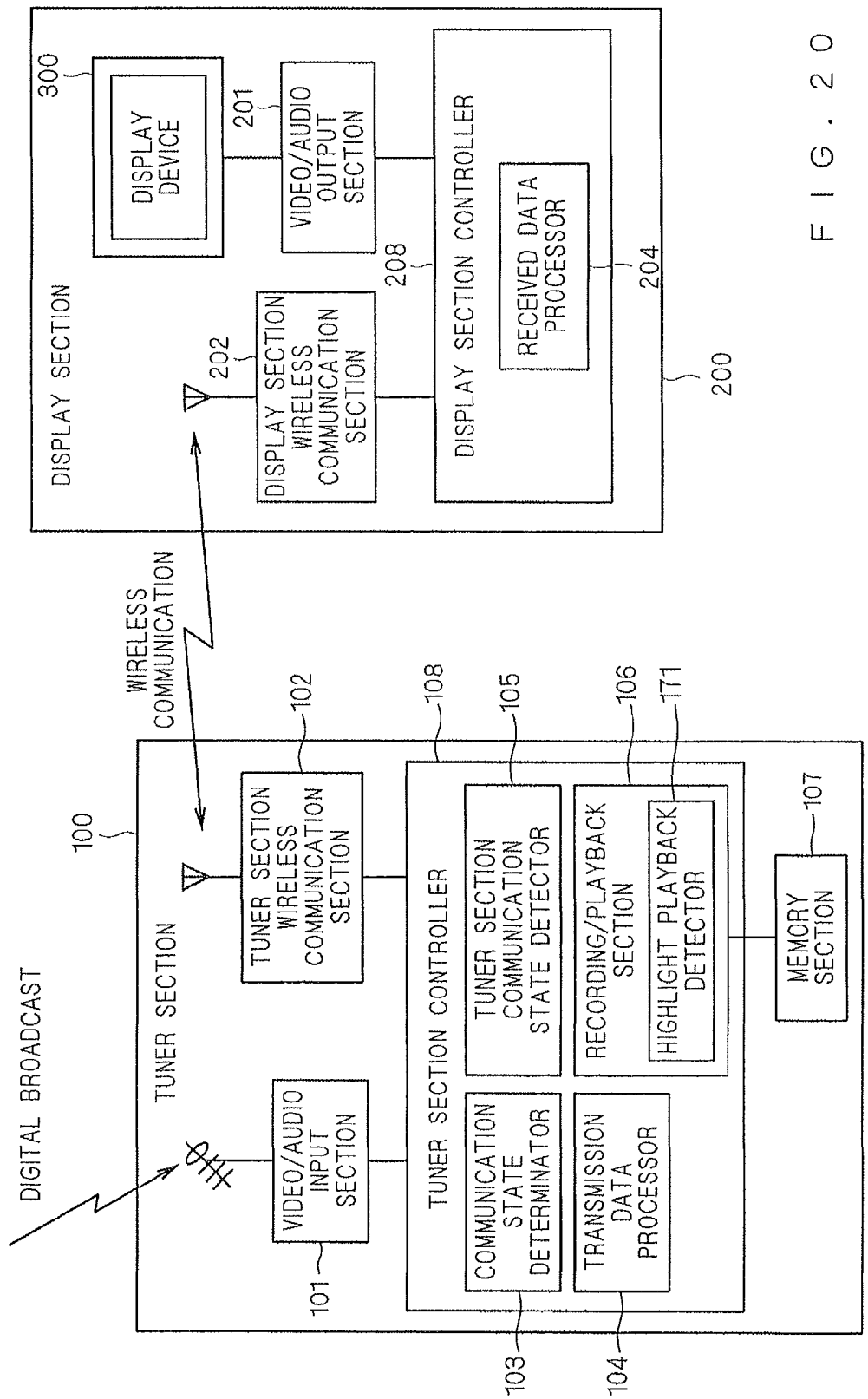
FIG. 20 is a constitutional diagram illustrating the television broadcast receiving device according to a ninth embodiment.

FIG. 20 illustrates a constitution of the television broadcast receiving device according to a ninth embodiment. When FIG. 20 is compared with FIG. 3 as the constitutional diagram in the first embodiment, a difference therebetween is that a highlight playback detector 171 is added to the recording/playback section 106. Since the other parts of the constitution and the operation are the same as those in the first embodiment, the description thereof is omitted.

When the communication state determinator 103 determines the communication state in the tuner section wireless communication section 102 as excellent, the highlight playback detector 171 reads the playback video data 123 from the memory section 107 at high speed. The highlight playback detector 171 analyzes the read playback video data 123, and detects a characteristic pattern (highlight scene). In a conventional example of the method for detecting a characteristic pattern, a portion where a volume of an audio signal indicates a predetermined value or more value is detected, and the portion where the volume indicates the predetermined value or more value is detected as the characteristic pattern. The characteristic pattern may be detected by methods other than this method. Highlight playback is performed by replaying patterns before and after the detected pattern. The detection of characteristic patterns is performed on the entire playback video data 123 read from the memory section 107. The highlight playback is performed on the respective detected characteristic patterns.

FIG. 21 illustrates a state of the highlight playback. The video data 121 for time ta at which the communication state is defective is recorded in the memory section 107. The recording/playback section 106 read the video data 121 as the playback video data 123 into the highlight playback detector 171. The highlight playback detector 171 analyzes the read playback video data 123, and detects a characteristic pattern. In an example of FIG. 21, the characteristic patterns are detected at time t1, t2 and t3. Predetermined portions that include the three characteristic patterns detected by the highlight playback detector 171 and before and after the three characteristic patterns are replayed. As a result, the replay time ta is required for the normal playback, but the playback time can be shortened to t4. The recording/playback section 106 records the video data 121 in the memory section 107 during the highlight playback, reads the video data 121, and performs the highlight playback on the video data 121. When the time of the playback video data 123 replayed by the highlight replay catches up with the time of the video data 121, the highlight playback is ended. When the highlight playback is ended, the input data selector 111 selects the video data 121 as the input data, and the recording/playback section 106 stops the recording in the memory section 107 and the playback from the memory section 107.

That is to say, in the television broadcast receiving device according to the ninth embodiment, the recording/playback section 106 detects a highlight scene of broadcast from the playback video data 123, and performs reading for predetermined time before and after the highlight scene. When the playback video data 123 read by the recording/playback section 106 catches up with the video data 121, the recording/playback section 106 stops the recording in the memory section 107 and the reading from the memory section 107. When the highlight playback detector 171 is provided to the recording/playback section 106 and the highlight playback detector 171 detects a highlight scene and performs the highlight playback, a delay during defective communication can be recovered more quickly than the method for replaying a main story or commercials at high speed. Further, since the user can roughly understand program contents during the defective communication, even if the viewing shifts to original digital broadcast after the highlight playback, the user easily understands the program contents.

(Effect)

In the television broadcast receiving device according to the ninth embodiment, the recording/playback section 106 detects a highlight scene of broadcast from the playback video data 123, and performs the reading for predetermined time before and after the highlight scene. When the video playback data 123 read by the recording/playback section 106 catches up with the video data 121, the recording/playback section 106 stops the recording in the memory section 107 and the reading from the memory section 107. Since the highlight playback detector 171 is provided to the recording/playback section 106 and the highlight playback detector 171 detects a highlight scene and performs the highlight playback, the delay during the defective communication can be recovered more quickly than the method for replaying a main story or commercials at high speed. Further, since the user can roughly understand program contents during the defective communication, even if the viewing shifts to original digital broadcast after the highlight playback, the user easily understands the program contents.

Tenth Embodiment

FIG. 22 illustrates a constitution of the television broadcast receiving device according to a tenth embodiment. When FIG. 22 is compared with FIG. 3 as the constitutional diagram in the first embodiment, a difference is that a display section communication state extractor 161 is added to the tuner section controller 108, and a display section communication state detector 205 is added to the display section controller 208. Since the other parts of the constitution and operation are the same as those in the first embodiment, the description thereof is omitted.

The display section communication state detector 205 detects a state of communication state in the display section wireless section 202 with the tuner section 100. The communication state is detected by detecting predetermined information indicating the communication state from a signal transmitted/received by the display section wireless communication section 202. For example, an error rate of transmission data is detected. In another manner, an SN ratio or a CN ratio of a transmission channel performing transmission to the tuner section 100 may be detected. In another manner, an SN ratio or a CN ratio of a transmission channel performing transmission from the tuner section 100 may be detected.

Some or all of these items may be detected. The display section controller 208 transmits the detected contents as the display section communication state data to the display section wireless communication section 202. The display wireless communication section 202 adds the display section communication state data to display section auxiliary data to be transmitted to the tuner section 100, and transmits the data to the tuner section 100.

The tuner section 100 transmits the display section auxiliary data transmitted from the display section 200 to the tuner section controller 108 via the tuner section wireless communication section 102. The display section communication state extractor 161 extracts the display section communication state data added to the display auxiliary data, and outputs the extracted data to the communication state determinator 103.

The communication state determinator 103 determines a communication state based on the tuner section communication state data detected by the tuner section communication state detector 105 and the display section communication state data detected by the display section communication state extractor 161. For example, the determination is made based on an increase in any one of error rates of the tuner section communication state data and the display section communication state data (error increases). In another method, the determination may be made based on that any one of SN ratios of the tuner section communication state data and the display section communication state data obtains a predetermined value or less value (noise increases).

That is to say, in the television broadcast receiving device according to the tenth embodiment, the display section 200 has the display section wireless communication section 202 that establishes wireless communication with the tuner section wireless communication section 102, and the display section communication state detector 205 that detects the communication state in the display section wireless communication section 202, and outputs the detected result as display section communication state data. The display section wireless communication section 202 receives the display section communication state data from the display section communication state detector 205, and transmits the data to the tuner section wireless communication section 202. The communication state determinator 103 receives the display section communication state data from the tuner section wireless communication section 105, and determines a defect of the communication state based on the display section communication state data and the tuner section communication state data. For example, when the wireless communication system is different between the transmission from the tuner section 100 to the display section 200 and the transmission from the display section 200 to the tuner section 100, in some cases, the detected result in the tuner section communication state detector 105 indicates the excellent communication state, but the detected result in the display section communication state detector 205 indicates the defective communication state, In this case, in the tenth embodiment, in addition to the detection of the communication state on the tuner section side, the communication state is detected also on the display section side, the communication state is determined based on both the detected results so that the communication state can be accurately determined. As a result, the user can view the broadcast contents without missing portions (Effect)

That is to say, in the television broadcast receiving device according to the tenth embodiment, the display section 200 has the display section wireless communication section 202 that establishes wireless communication with the tuner section wireless communication section 102, and the display section communication state detector 205 that detects the communication state in the display section wireless communication section 202, and outputs the detected result as display section communication state data. The display section wireless communication section 202 receives the display section communication state data from the display section communication state detector 205, and transmits the display section communication state data to the tuner section wireless communication section 202. The communication state determinator 103 receives the display section communication state data from the tuner section wireless communication section 105, and determines a defect of the communication state based on the display section communication state data and the tuner section communication state data. For example, when the wireless communication system is different between the transmission from the tuner section 100 to the display section 200 and the transmission from the display section 200 to the tuner section 100, in some cases, the detected result in the tuner section communication state detector 105 indicates the excellent communication state, but the detected result in the display section communication state detector 205 indicates the defective communication state. In this case, in the tenth embodiment, in addition to the detection of the communication state on the tuner section side, the communication state is detected also on the display section side, and the communication state is determined based on both the detected results so that the communication state can be accurately determined. As a result, the user can view the broadcast contents without missing parts.

While the invention has been shown and described in detail, the foregoing description is in all aspects illustrative and not restrictive. It is therefore understood that numerous modifications and variations can be devised without departing from the scope of the invention.

What is claimed is:

1. A television broadcast receiving device comprising:
a tuner section for receiving television broadcast;
a display section for receiving a video/audio signal from said tuner section through wireless communication, and displaying a video based on the video/audio signal; and
a recording section connected to said tuner section via a network, for receiving a broadcast signal received by said tuner section from said tuner section via said network based on a receiving state of said video/audio signal in said display section, and recording the broadcast signal, wherein:
said tuner section has:
  a wireless transmission section for transmitting said video/audio signal to said display section;
  a transmission state monitoring section for receiving said video/audio signal before transmission to said display section in said wireless transmission section; and
  a tuner side wireless LAN interface (I/F);
said recording section has:
  a recording side wireless LAN I/F for communication with said tuner side wireless LAN I/F through wireless LAN; and
  a storage device;
said tuner side wireless LAN I/F receives said video/audio signal wirelessly transmitted from said wireless transmission section to said display section as a received signal;
said transmission state monitoring section calculates a level of a disturbing signal within a transmission band from said video/audio signal in said wireless transmission section and said received signal;

said tuner section further includes a recording/playback controller for, when said level of said disturbing signal indicates a predetermined value or more value, transmitting and recording said receiving broadcast signal to and in said recording section, and when said level of said disturbing signal drops to be not more than said predetermined value, reading said broadcast signal recorded in said recording section;

said broadcast signal read by said recording section is wirelessly transmitted as said video/audio signal to said display section; and said recording/playback controller records and reads said broadcast signal in and from said storage device via said tuner side wireless LAN I/F and said recording side wireless LAN I/F.

2. A television broadcast receiving device comprising:

a tuner section for receiving a broadcast signal, selecting said broadcast signal to decode said broadcast signal, and converting said broadcast signal into a video/audio signal with a format suitable for wireless communication; and a display section for receiving said video/audio signal from said tuner section through wireless communication, and displaying a video based on the video/audio signal; wherein said tuner section has:
- a broadcast signal receiving section for receiving said broadcast signal,
- a signal processor for converting said broadcast signal into a video/audio signal with a format suitable for wireless transmission to said display section;
- a frame information adding section for adding frame information indicating an order of frames of a video signal composing said video/audio signal;
- a wireless transmission section for wirelessly transmitting said video/audio signal to which said frame information is added;
- a recording/playback controller for recording said broadcast signal and said frame information in a recording section and reading said broadcast signal recorded in said recording section from said recording section; and
- a receiving state detector for receiving a receiving state information about said video/audio signal wirelessly transmitted from said wireless transmission section; and said display section has:
- a wireless receiving section for receiving said video/audio signal wirelessly transmitted from said wireless transmission section;
- a display device for display a video;
- a display processor for displaying a video based on said video/audio signal received by said wireless receiving section on said display device; and
- a receiving state monitoring section for determining whether a frame is missing in said video/audio signal received by said wireless receiving section, and when the determination is made that a frame is missing, transmitting the determined result including frame information about said missing frame as said receiving state information to said receiving state detector.

3. The television broadcast receiving device according to claim 2, wherein when said receiving state detector receives said receiving state information including the frame information about said missing frame, said recording/playback controller reads said broadcast signal corresponding to the frame information about said missing frame from said recording section, said signal processor converts said read broadcast signal to said video/audio signal, and said wireless transmission section wirelessly transmits said video/audio signal to said wireless receiving section.

4. The television broadcast receiving device according to claim 2, wherein said signal processor has:
- a digital demodulator for demodulating said broadcast signal received by said broadcast signal receiving section; and
- a decoder for decoding said demodulated broadcast signal to said video/audio signal.

5. The television broadcast receiving device according to claim 2, wherein said receiving state information is transmitted from said receiving state monitoring section to said receiving state detector through any one of wireless transmission and wired transmission.

6. The television broadcast receiving device according to claim 2, wherein said frame information includes numbers given to respective frames or numbers given to each predetermined number of frames.

7. The television broadcast receiving device according to claim 2, wherein said frame information includes time stamps given to respective frames.

8. The television broadcast receiving device according to claim 2, wherein said recording/playback controller records said video data in said recording section through loop recording, and replays said video data from said recording section through loop playback.

9. The television broadcast receiving device according to claim 8, wherein said loop recording and said loop playback are performed in a part of storage capacity of said recording section.

10. The television broadcast receiving device according to claim 2, wherein:
said recording/playback controller detects commercials from a broadcast signal to be read from said recording section, and temporarily compresses only the commercials so as to read said broadcast signal at high speed; and
when said broadcast signal to be read catches up with a broadcast signal of a program, the recording in said recording section and the reading from said recording section are stopped.

11. The television broadcast receiving device according to claim 2, wherein:
said recording/playback controller detects a highlight scene of broadcast from a broadcast signal to be read from said recording section and performs reading for predetermined time before and after said highlight scene; and
when said broadcast signal to be read catches up with a broadcast signal of a program, the recording in said recording section and the reading from said recording section are stopped.

* * * * *